US006826192B2

(12) United States Patent
Shimamura et al.

(10) Patent No.: US 6,826,192 B2
(45) Date of Patent: Nov. 30, 2004

(54) INTERFACE APPARATUS

(75) Inventors: Akira Shimamura, Yokohama (JP); Yoshihiro Uchida, Kawasaki (JP); Makoto Adachi, Yokohama (JP); Yoshiyuki Tokoi, Yokohama (JP); Hirotoshi Mori, Yokohama (JP); Hajime Yamashita, Yokohama (JP)

(73) Assignee: Fujitsu Limited, Kawsaki (JP)

( * ) Notice: Subject to any disclaimer, the term of this patent is extended or adjusted under 35 U.S.C. 154(b) by 783 days.

(21) Appl. No.: 09/766,001

(22) Filed: Jan. 19, 2001

(65) Prior Publication Data

US 2001/0033575 A1 Oct. 25, 2001

(30) Foreign Application Priority Data

Apr. 19, 2000 (JP) ....................................... 2000-117886

(51) Int. Cl.[7] ............................................... H04L 12/28
(52) U.S. Cl. ....................................... 370/419; 370/474
(58) Field of Search ......................... 370/395.6, 395.52, 370/419, 474

(56) References Cited

U.S. PATENT DOCUMENTS 5,206,858 A 4/1993 Nakano et al.
5,541,926 A 7/1996 Saito et al.
5,703,878 A 12/1997 Duault
5,848,067 A 12/1998 Osawa et al.
5,917,824 A 6/1999 Brueckheimer et al.
6,418,144 B1 * 7/2002 Saeki ...................... 370/395.6
6,522,667 B1 * 2/2003 Oda et al. ................... 370/474

FOREIGN PATENT DOCUMENTS

JP 09247183 9/1997

OTHER PUBLICATIONS

Chan, et al., "A 622 Mbps ATM Physical Layer ASIC and its Design for Test Methods" Computers and Communications 1997; Jul. 1997 XP010241373, ISBN: 0–8186–7852–6; pp. 349–353.

* cited by examiner

*Primary Examiner*—Salvatore Cangialosi
(74) *Attorney, Agent, or Firm*—Katten Muchin Zavis Rosenman

(57) ABSTRACT

Disclosed is an interface apparatus in a communication network for converting a frame, which has been received from a digital transmission line and has overhead and a payload, to ATM cells, assembling a frame using ATM cells that have been received from an ATM network, and sending the assembled frame to a digital transmission line. The apparatus includes cell conversion zone specifying means for defining, as a cell conversion zone, the smallest possible portion of a frame that contains the overhead data and payload, and generating a signal that specifies the cell conversion zone; pointer creation means for creating a pointer which specifies a predetermined position of the cell conversion zone as a reference position; and cell conversion means for converting data in the cell conversion zone into cells based upon the signal that specifies the cell conversion zone, and for inserting this pointer, which indicates the reference position of the cell conversion zone, in a prescribed cell. On the ATM-cell receiving side, the apparatus detects pointers, assembles ATM cells into a frame based upon the pointers and transmits the frame.

14 Claims, 26 Drawing Sheets

FIG. 11

POSITION REPORTED BY TOP

| | | | | | | | | | | | | | | | |
|---|---|---|---|---|---|---|---|---|---|---|---|---|---|---|---|
| A1#1 0 | A1#2 1 | A1#3 2 | A2#1 3 | A2#2 4 | A2#3 5 | J0 6 | Z0#2 7 | Z0#3 8 | SPE 9 | SPE 10 | SPE 11 | ………… | SPE 267 | SPE 268 | SPE 269 |
| B1 270 | X 271 | X 272 | E1 273 | X 274 | X 275 | F1 276 | X 277 | X 278 | SPE 279 | SPE 280 | SPE 281 | ………… | SPE 537 | SPE 538 | SPE 539 |
| D1 540 | X 541 | X 542 | D2 543 | X 544 | X 545 | D3 546 | X 547 | X 548 | SPE 549 | SPE 550 | SPE 551 | ………… | SPE 807 | SPE 808 | SPE 809 |
| H1#1 810 | H1#2 811 | H1#3 812 | H2#1 813 | H2#2 814 | H2#3 815 | H3#1 816 | H3#2 817 | H3#3 818 | SPE 819 | SPE 820 | SPE 821 | ………… | SPE 1077 | SPE 1078 | SPE 1079 |
| B2#1 1080 | B2#2 1081 | B2#3 1082 | K1 1083 | X 1084 | X 1085 | K2 1086 | X 1087 | X 1088 | SPE 1089 | SPE 1090 | SPE 1091 | ………… | SPE 1347 | SPE 1348 | SPE 1349 |
| D4 1350 | X 1351 | X 1352 | D5 1353 | X 1354 | X 1355 | D6 1356 | X 1357 | X 1358 | SPE 1359 | SPE 1360 | SPE 1361 | ………… | SPE 1617 | SPE 1618 | SPE 1619 |
| D7 1620 | X 1621 | X 1622 | D8 1623 | X 1624 | X 1625 | D9 1626 | X 1627 | X 1628 | SPE 1629 | SPE 1630 | SPE 1631 | ………… | SPE 1887 | SPE 1888 | SPE 1889 |
| D10 1890 | X 1891 | X 1892 | D11 1893 | X 1894 | X 1895 | D12 1896 | X 1897 | X 1898 | SPE 1899 | SPE 1900 | SPE 1901 | ………… | SPE 2157 | SPE 2158 | SPE 2159 |
| S1 2160 | Z1#2 2161 | Z1#3 2162 | M0 2163 | Z2#2 2164 | Z2#3 2165 | E2 2166 | X 2167 | X 2168 | SPE 2169 | SPE 2170 | SPE 2171 | ………… | SPE 2427 | SPE 2428 | SPE 2429 |

*LOWER VALUE IS VALUE OF STS-CTR COUNT
*BYTES WITHIN BOLD BORDER UNDERGO AAL-1 CONVERSION (RXoH = "0")

FIG. 12

POSITION REPORTED BY TOP

| | | | | | | | | | | | | | | | |
|---|---|---|---|---|---|---|---|---|---|---|---|---|---|---|---|
| A1#1 | A1#2 | A1#3 | A2#1 | A2#2 | A2#3 | J0 | Z0#2 | Z0#3 | SPE 2357 | SPE 2356 | SPE 2355 | ........ | SPE 2099 | SPE 2098 | SPE 2097 |
| B1 | X | X | E1 | X | X | F1 | X | X | SPE 2096 | SPE 2095 | SPE 2094 | ........ | SPE 1838 | SPE 1837 | SPE 1836 |
| D1 | X | X | D2 | X | X | D3 | X | X | SPE 1835 | SPE 1834 | SPE 1833 | ........ | SPE 1577 | SPE 1576 | SPE 1575 |
| H1#1 1574 | H1#2 1573 | H1#3 1572 | H2#1 1571 | H2#2 1570 | H2#3 1569 | H3#1 1568 | H3#2 1567 | H3#3 1566 | SPE 1565 | SPE 1564 | SPE 1563 | ........ | SPE 1307 | SPE 1306 | SPE 1305 |
| B2#1 | B2#2 | B2#3 | K1 | X | X | K2 | X | X | SPE 1304 | SPE 1303 | SPE 1302 | ........ | SPE 1046 | SPE 1045 | SPE 1044 |
| D4 | X | X | D5 | X | X | D6 | X | X | SPE 1043 | SPE 1042 | SPE 1041 | ........ | SPE 785 | SPE 784 | SPE 783 |
| D7 | X | X | D8 | X | X | D9 | X | X | SPE 782 | SPE 781 | SPE 780 | ........ | SPE 524 | SPE 523 | SPE 522 |
| D10 | X | X | D11 | X | X | D12 | X | X | SPE 521 | SPE 520 | SPE 519 | ........ | SPE 263 | SPE 262 | SPE 261 |
| S1 | Z1#2 | Z1#3 | M0 | Z2#2 | Z2#3 | E2 | X | X | SPE 260 | SPE 259 | SPE 258 | ........ | SPE 2 | SPE 1 | SPE 0 |

*LOWER VALUE IS VALUE OF DCNT COUNT
*BYTES WITHIN BOLD BORDER UNDERGO AAL-1 CONVERSION (RXoH = "0")

CSi : INDICATES P-FORMAT (0: NON-P-FORMAT, 1: P-FORMAT)

SC : SEQUENCE COUNT VALUE

INV : INDICATES HEADER INVALID (0: VALID、 1: INVALID)

DUM : DUMMY CELL FLAG (0: ORDINARY CELL, 1: DUMMY CELL )

INTERFACE APPARATUS

BACKGROUND OF THE INVENTION

This invention relates to an interface apparatus having a circuit emulation function. More particularly, the invention relates to an interface apparatus, which is provided between a digital transmission network, such as an STS-N (where N represents an integer) digital transmission network, and an ATM network, for eliminating an unnecessary part of frame data (e.g., STS-3 data) in the digital transmission network, forming only the necessary part of the data into cells, sending the cells to the ATM network, assembling frame data (e.g., STS-3 data) of the digital transmission network from cells received from the ATM network, and sending the assembled frame data to the digital transmission network.

As shown in FIG. 30, a dedicated service network constituted by an optical transmission line of a SONET (Synchronous Optical Network) enables communication by connecting terminals CPE such as DS3, STS-3 or STS-12 terminals by optical transmission lines via multiplexer/demultiplexers MDX and digital cross-connect systems DCCS. Dedicated service networks differ from ordinary telephone communication networks or the like in that they do not require call-connect and call-disconnect processing and in that entrances to and exists from such networks are decided in a semi-permanent manner. A DCCS has functions such as path switching, multiplexing/demultiplexing and frame add/drop but does not have a function for dynamic routing as does an exchange. For this reason, conventional dedicated service networks have problems relating to network maintenance. For example, it is not easy to carry out network rerouting and expansion (1) when it is desired to establish an alternative path between terminals owing to a decline in the quality of or the occurrence of a failure in a specific transmission path and (2) when it is desired to expand a network owing to an increase in traffic over a specific path.

Accordingly, there is demand for a dedicated service network in which network rerouting and expansion can be performed by substituting an ATM switch for a DCCS and issuing commands and making settings directly from a center. FIG. 31 is a conceptual view for a case where an OC3 DCCS is replaced by an ATM switch. In order to replace the OC3 DCCS by the ATM switch, not only are a switch ATM-SW and a controller CNTL necessary but it is also required that the transmission paths have interfaces (STS-3 CES) INF1 to INF4 through which the optical transmission lines of an OC3 SONET interwork with the ATM switch. Each of the interfaces INF1 to INF4 has a circuit emulation (CE) function. The interfaces INF1, INF2 convert STS-3 frame data, which has been received from an optical transmission line, to ATM cells, and the interfaces INF3, INF4 assemble ATM cells into an STS-3 frame format and send the frames to an optical transmission line.

In a case where STS-N (where N represents an integer) frame data is converted to ATM cells in such an interface, it is necessary to convert the frame data and send it to an ATM network in such a manner that the transmission band is reduced. Moreover, it is necessary for data in the original STS-N frame format to be assembled from received cells and transmitted to a digital transmission line.

An interface for receiving cells from an ATM network, assembling the cells into a frame format and transmitting the results to an optical transmission line is provided with a receive buffer of a prescribed capacity for two purposes, namely (1) for clock transfer and (2) to accommodate fluctuations in cell arrival. An initial fill level (IFL) is set for the receive buffer in such a manner that (1) the receive buffer will not be emptied if the ATM cell arrival interval is such that cells do not arrive over an assumed period of time and (2) the receive buffer will not overflow if the ATM cell arrival interval is such that too many cells arrive over an assumed period of time. If the IFL fluctuates so as to cause starvation or overflow of the receive buffer, the continuity of information cannot be maintained and cell discard occurs. Accordingly, it is necessary to exercise control in such a manner that the IFL will not fluctuate even if cell loss, insertion of erroneous cells or garbling of cells, etc., occur, thereby assuring that the receive buffer will not experience starvation or overflow.

SUMMARY OF THE INVENTION

Accordingly, an object of the present invention is to arrange it so that STS-N frame data can be converted to ATM cells so as to reduce the transmission band, and so that the STS-N frame format can be assembled from received cells.

Another object of the present invention is to arrange it so that a large quantity of reproduced data will not be lost if P-format cells are lost, and so that an IFL that has been set for a receive buffer will not fluctuate owing to cell loss, insertion of erroneous cells or garbling of cells, etc., thereby assuring that the receive buffer will not experience starvation or overflow.

According to the present invention, (1) the part of a frame that contains a payload and overhead data, which indicates the starting position of a low-bit-rate data block multiplexed into a frame, is defined as a cell conversion zone; (2) the data in the cell conversion zone is converted cells when a prescribed position in the cell conversion zone is adopted as a reference position; and (3) a pointer that specifies the reference position is included in a prescribed cell. If this arrangement is adopted, only the portion of the overhead that will be necessary later need be converted cells. As a result, the amount of transmitted data can be reduced, thereby making it possible to reduce the transmission band. Since the pointer that specifies the prescribed position (e.g., the starting position) of the cell conversion zone in a frame is incorporated in a cell, the interface on the receiving side can assemble a frame from received cells upon referring to the pointer. A cell that contains a pointer shall be referred to as a P-format cell and a cell that does not contain a pointer shall be referred to as a non-P-format cell.

Further, according to the present invention, a cell payload of AAL Type 1 received from an ATM network is stored in a receive buffer in sync with the clock of the ATM network, and the cell payload is read out of the receive buffer in sync with a clock on the side of a digital transmission line, thereby performing clock transfer. Further, a pointer is detected from a cell payload that has been read out of the receive buffer, the starting position of a cell conversion zone is identified based upon the pointer, and a frame is assembled using data output from the receive buffer based upon the starting position of the cell conversion zone. If this arrangement is adopted, the interface can recognize the cell conversion zone in a frame and the starting position of each byte in the frame based upon the pointer, as a result of which it is possible to assemble the original frame from the data read out of the receive buffer. In case of AAL Type 1, one cycle is constructed by eight cells and a sequence count SC (=0 to 7) is assigned to each cell.

Further, according to the present invention, timing at which a succeeding pointer will appear is predicted by pointer detection. If a P-format cell does not appear at the predicted timing and the cell at this timing is an invalid cell or dummy cell, the cell is judged to be a P-format cell. Further, if an arriving cell is a cell whose sequence count SC is 6, this cell is an invalid cell or dummy cell and, moreover, a P-format cell has not yet been detected between SC=0 and SC=7, then the arriving cell is judged to be a P-format cell.

If this arrangement is adopted, a P-format cell can be generated even if a P-format cell is lost owing to cell loss or cell garbling, and it can be so arranged that the IFL that has been set for a receive buffer will not fluctuate. This makes it possible to assure that starvation and overflow will not occur.

Further, timing at which a succeeding pointer will appear is predicted by pointer detection. When a P-format cell is lost at the predicted timing, a prescribed cell is judged to be a P-format cell based upon this timing. This makes it possible to raise the precision with which P-format cells are judged. By virtue of the foregoing, a cell can be assumed to be a P-format cell correctly every cycle (SC=0~7) and the IFL of a receive buffer can be prevented from fluctuating as a result of judging a P-format cell to be a non-P-format cell or judging a non-P-format cell to be a P-format cell. Moreover, even if a P-format cell is lost, the fact that a prescribed cell is assumed to be a P-format cell assures that a large quantity of reproduced data will not be lost as a consequence of loss of P-format cells.

Further, according to the present invention, a cell (dummy cell or invalid cell) that has a high likelihood of being a P-format cell is assumed to be a P-format cell when a P-format cell has been lost. As a result, a cell can be assumed to be a P-format cell correctly every cycle (SC=0~7) and therefore the IFL of a receive buffer can be prevented from fluctuating. Moreover, even if a P-format cell is lost, the fact that a prescribed cell is assumed to be a P-format cell assures that a large quantity of reproduced data will not be lost as a consequence of loss of P-format cells.

Further, according to the present invention, whether a cell having an even-numbered SC value is a P-format cell is checked successively every cycle and, when a P-format cell is lost, a cell for which SC is equal to 6 is assumed to be a P-format cell. If this expedient is adopted, a cell can be assumed to be a P-format cell through a simple arrangement and it possible to assure agreement between the bands of STS-3 and ATM networks.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a diagram showing the relationship between the value of a count in an STS counter and an STS-3 frame;

FIG. 12 is a diagram showing the relationship between the value of a count in an STS downcounter and an STS-3 frame;

DESCRIPTION OF THE PREFERRED EMBODIMENTS (A) Overview of the Invention (a) Frame Format Though the present invention is applicable generally to STS-N (where N represents an integer) frames, a case in which the invention is applied to an STS-3 frame will be described below.

Figure 1:
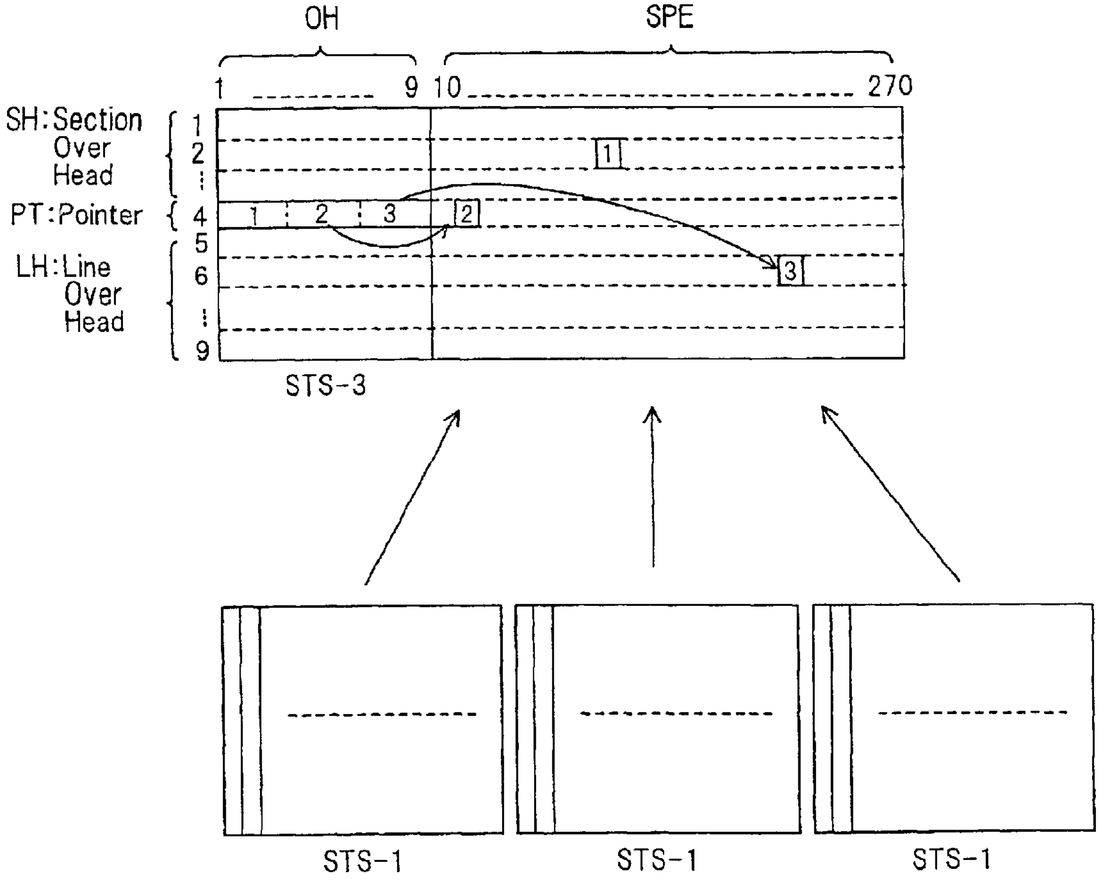
FIG. 1 is a diagram useful in describing an STS-3 frame format.

FIG. 1 is a diagram useful in describing an STS-3 frame format. A 155.52-Mbps STS-e frame is obtained by multiplexing three 50-Mbps frames and adding on overhead. The STS-3 frame is composed of 9×270 bytes. The initial 9×9 bytes constitutes overhead OH and the remaining 9×261 bytes constitutes a payload SPE. The overhead OH is composed of section overhead SH, line overhead LH and a 9-byte pointer PT. Section overhead SH is for transmitting a frame synchronizing signal and a repeater-section error monitoring signal, and line overhead LH is for transmitting a multiplex-section error monitoring signal and a multiplex-section status signal (AIS/FERF: Alarm Indication Signal/Far-End Receive Failure). The pointer PT indicates the starting positions of the three multiplexed STS-1 frames and is used when decomposing the STS-3 frame into the STS-1 frames.

(b) Cell Conversion Zone

Figure 2:
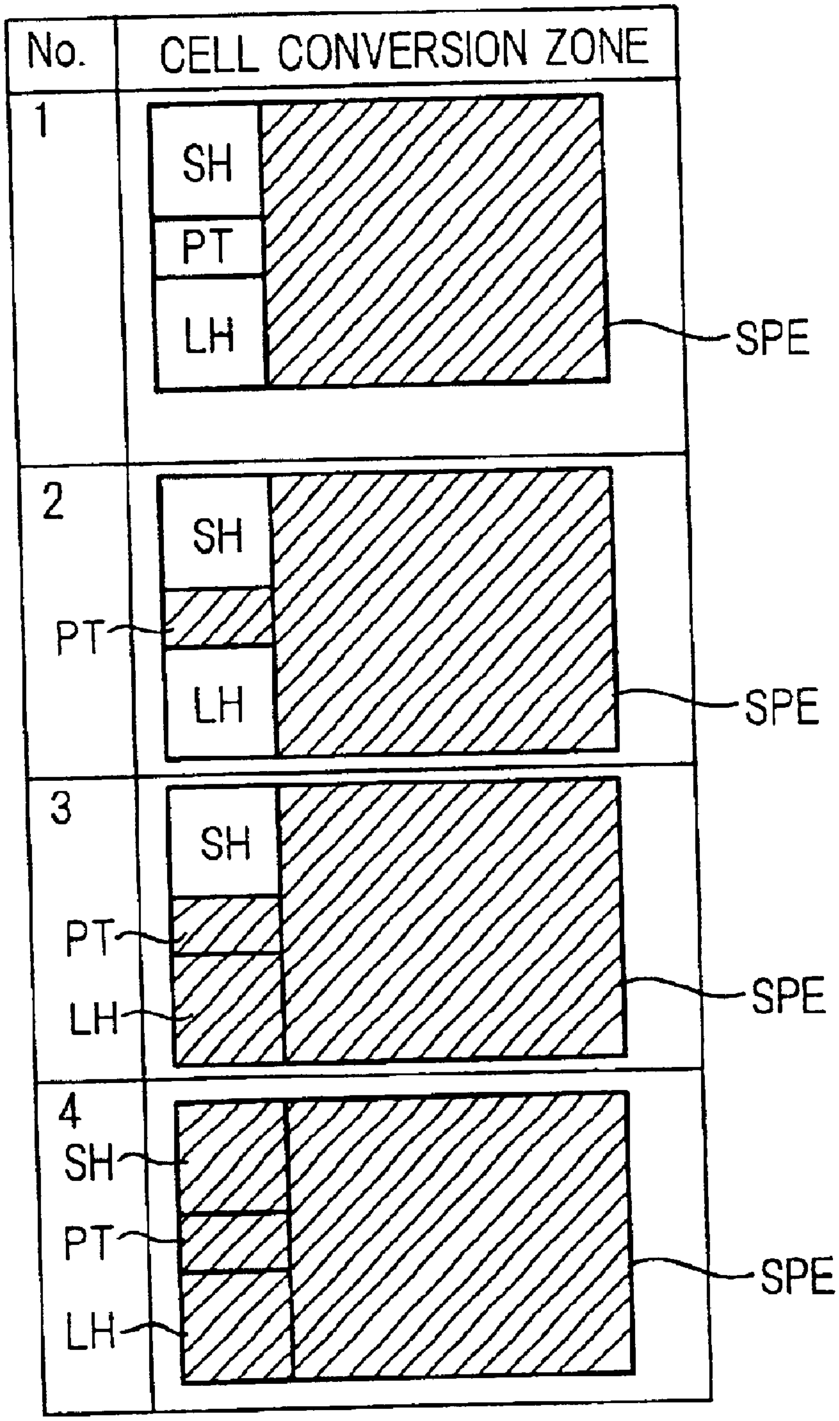
FIG. 2 is a diagram useful in describing cell conversion zones of an STS-3 frame.

When such STS-3 frame data is converted to ATM cells and transmitted, it is necessary to reduce the transmission band and construct the original STS-3 frame data from received cells on the receiving side. The part of the data to be transmitted is reduced in order to reduce the transmission band. Accordingly, the structure of the STS-3 frame is taken into consideration, the portion unnecessary for the network of the other party is deleted and only the portion truly required undergoes cell conversion, thereby reducing the quantity of information. FIG. 2 is a diagram useful in describing the cell conversion zone of an STS-3 frame. There are four types of cell conversion zones, which are as follows:

(1) With a first cell conversion zone (No. 1), only the payload SPE is transmitted. In accordance with the first cell conversion zone, the transmission band can be reduced. In order to achieve transmission without omission, however, it is necessary to terminate the path layer, decompose the STS-3 frame into three STS-1 frames and transmit the frames on three connections. If the STS-1 SPE level has a steady deviation, it is required that asynchronous clocking be carried out.

(2) With a second cell conversion zone (No. 2), the pointer PT and payload SPE are transmitted. In accordance with the second cell conversion zone, transmission can be achieved by a single connection. In addition, transmission based upon synchronous clocking can be performed and, moreover, the transmission band can be made comparatively small.

(3) With a third cell conversion zone (No. 3), the pointer PT, line overhead LH and payload SPE are transmitted. In accordance with the third cell conversion zone, transmission can be achieved by a single connection. In addition, though transmission based upon synchronous clocking can be performed, the fact that the line overhead LH is transmitted means that the transmission band is broadened in comparison with the second cell conversion zone.

(4) With a fourth cell conversion zone (No. 4), all frame data (pointer PT, section overhead SH, line overhead LH and payload SPE) is transmitted. In accordance with the third cell conversion zone, transmission can be achieved by a single connection. In addition, though transmission based upon synchronous clocking can be performed, the fact that section overhead SH and line overhead LH are transmitted means that the transmission band is broadened in comparison with the second cell conversion zone.

Figure 3:
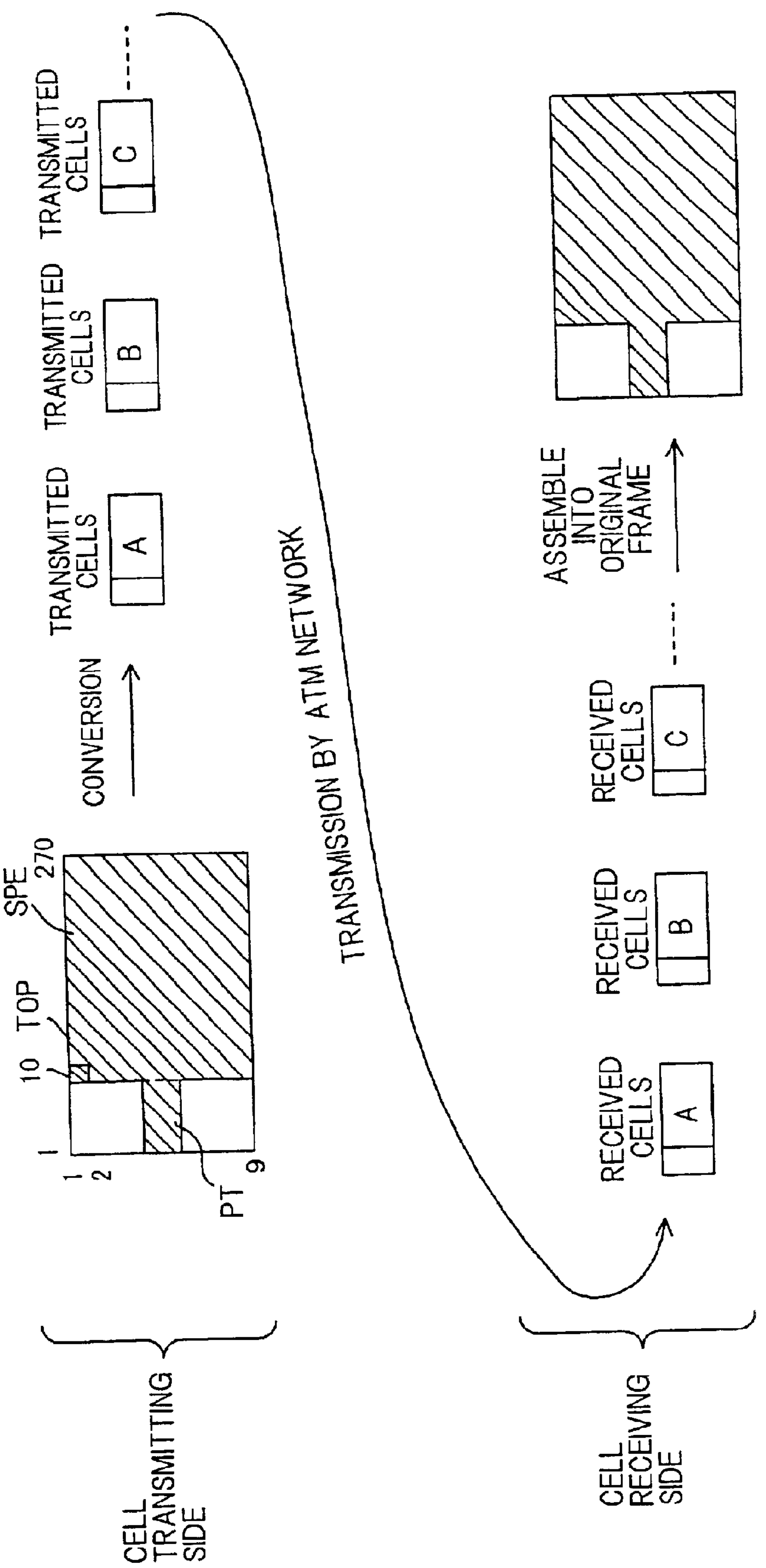
FIG. 3 is a diagram useful in describing frame decomposition/assembly.

When the four cell conversion zones described above are considered, it will be appreciated that the second cell conversion zone is best. According to the present invention, therefore, the hatched portion (pointer PT and payload SPE) indicated by the second cell conversion zone is converted to cells and transmitted, as shown in FIG. 3, to reduce the amount of transmitted information. Since termination of the section layer and line layer has been requested by the user, no problems arise even when section overhead SH and line overhead LH are deleted.

(c) Method of Identifying Structured Data

When STS-3 frame data is converted to cells and transmitted, as shown in FIG. 3, the interface at the exit of the ATM network must be capable of assembling the original STS-3 frame data from the received cells. To achieve this, an arrangement must be adopted in which it is possible to recognize a reference position in the cell conversion zone of the STS-3 frame, e.g., the initial byte position (row 1, column 10) TOP of the payload SPE. Hence, according to the present invention, AAL Type 1 (ATM Adaptation Layer Type 1) cells are used as the ATM cells and the reference position TOP of the cell conversion zone is designated by an SDT pointer (Structured Data Transfer pointer) of an AAL Type 1 Cell. If this arrangement is adopted, the interface on the cell receiving side recognizes an SDT-pointer-containing cell by a CSI (Convergence Sublayer Identifier) included in the SAR-PDU header of an AAL Type 1 cell, recognizes the reference position TOP based upon the SDT pointer of this cell and can assemble the original STS-3 frame data. It should be noted that the section overhead SH and line overhead LH are created independently and inserted into the STS-3 frame format.

Figure 4:
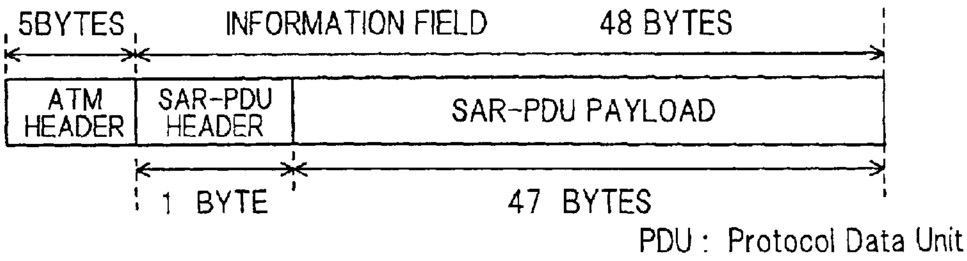
FIG. 4 is a diagram useful in describing the structure of an AAL Type 1 cell.
Figure 5:
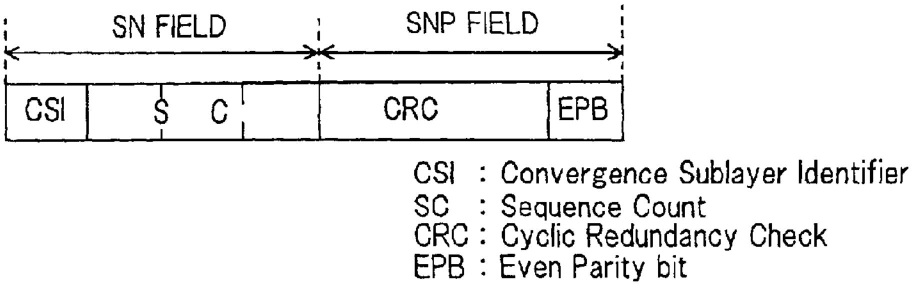
FIG. 5 is a diagram useful in describing the structure of an SAR-PDU header.

FIG. 4 is a diagram useful in describing the format of an AAL Type 1 (AAL-1) ATM cell, and FIG. 5 is a diagram useful in describing the format of a 1-byte SAR-PDU. The first five bytes of an AAL-1 cell constitute the ATM header and the remaining 48 bytes constitute the cell payload (information field). The information field is composed of a 1-byte SAR-PDU (PSU stands for "Protocol Data Unit") header and a 47-byte SAR-PDU payload. The SAR-PDU payload is used to transfer user data, and the SAR-PDU header is composed of a 4-bit SN (Sequence Number) field and a 4-bit SNP (Sequence Number Protection) field, as illustrated in FIG. 5.

The SN field is divided into two subfields, namely a CSI (Convergence Sublayer Identifier) and SC (Sequence Count), and the SNP field also is divided into two subfields, namely a CRC (Cyclic Redundancy Check) and EPB (Even Parity Bit). The SC subfield counts cells cyclically from 0 to 7 (i.e., 0, 1, . . . , 7, 0, 1, . . . , 7, 0, 1, . . . ) and makes it possible to monitor the sequence of the cells and to detect cell loss and erroneous cell insertion. Error detection and correction of the SN field are performed by the CRC and EPB subfields.

The CRC is a value based upon a polynomial $[G(X)=X^3+X+1)$ with respect to the sequence number. The EPB is an even-numbered parity bit in the SAR-PDU header. The CSI bit is the CS (Convergence Sublayer) function of the AAL-1 cell and is used to send and reproduce the timing information of the user clock and to transfer the SDT pointer.

Figure 6:
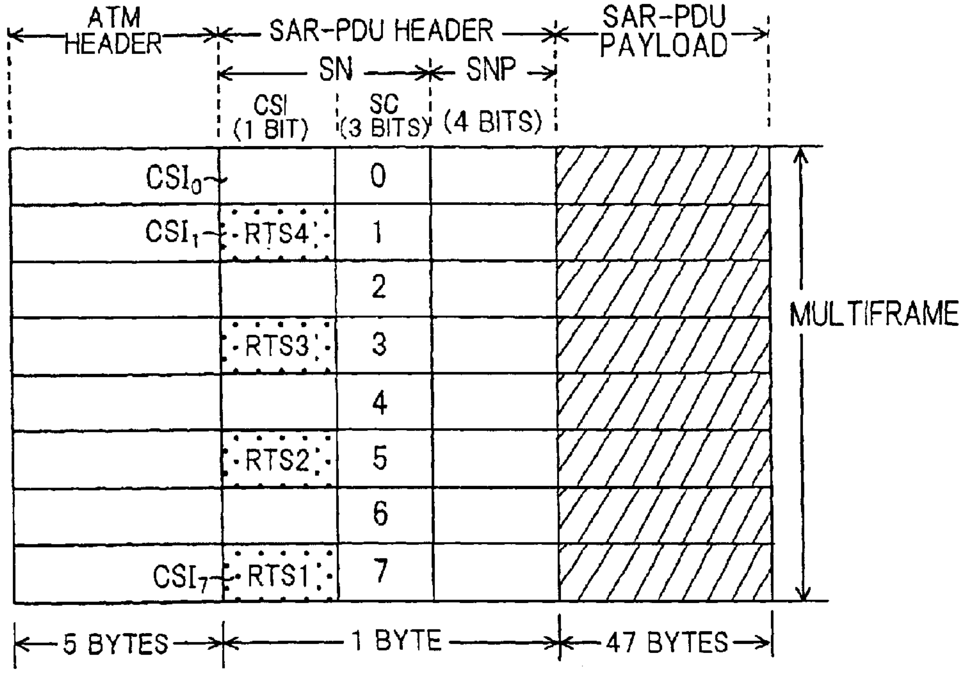
FIG. 6 is a diagram useful in describing the structure of an RTS information format.

Transmission and reproduction of user-clock timing information is by the SRTS (Synchronous Residual Time Stamp) method. In accordance with the SRTS method, the timing information of the user clock is composed of 4-bit information (RTS4, RTS3, RTS2, RTS1) referred to as an RTS (Residual Time Stamp). This RTS information is transferred by the CSI bit every eight cells, as depicted in FIG. 6. That is, a multiframe (one cycle) is constituted by eight AAL-1 cells (SC=0~7). The CSI has an 8-bit structure ($CSI_0$ to $CSI_7$) corresponding to SC values of 0 to 7, respectively. Four-bit RTS information RTS1~RTS4 is sent by CSI bits (CSI1, CSI3, CSI5, CSI7) of ATM cells whose SC values are 1, 3, 4, 7. This 4-bit RST information RTS1~RTS4 is the count of a 4-bit counter obtained when a network clock is cyclically counted by a 4-bit counter and a clock on the transmitting side is frequency divided by 3008 and pulses resulting from this frequency division are generated. By transmitting this RTS information, a clock synchronized to the clock on the transmitting side can be generated on the cell receiving side and data can be transmitted to a terminal in sync with this clock. It should be noted that the figure of 3008 mentioned above is the number (8 cells×47 bytes×8 bits) of bits of user data in eight ATM cells.

Figure 7A:
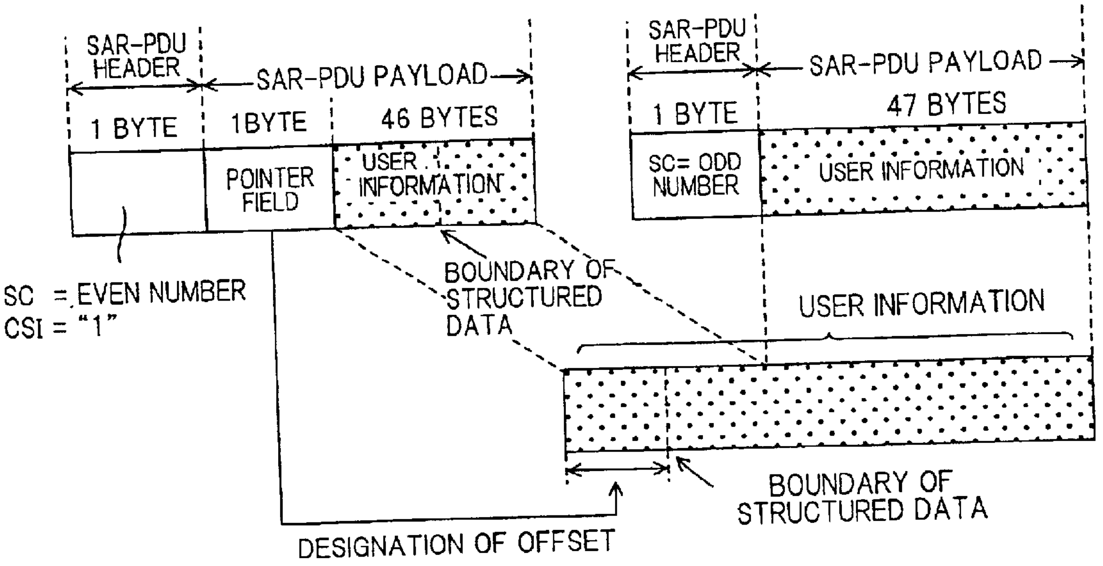
FIGS. 7A, 7B are diagrams useful in methods of identifying the boundaries of structured data.
Figure 7B:
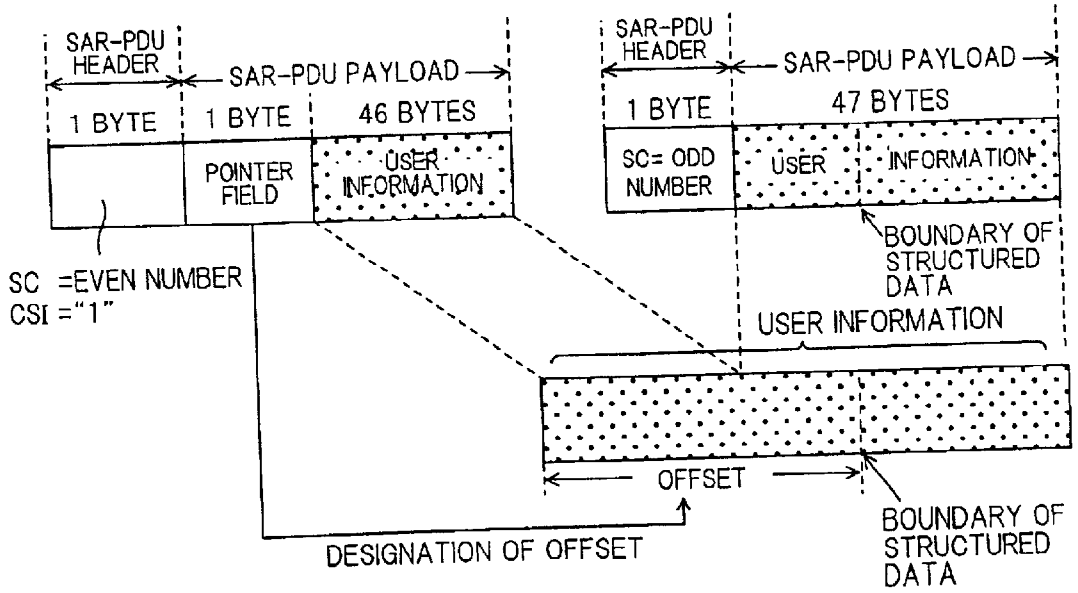

When n×64-kbps-structured data (where n=9×270=2430 in case of STS-3) is transferred, the SDT pointer describes the boundary (e.g., the beginning of the frame) of the structured data. As shown in FIGS. 7A and 7B, there are two format types (P-format, which means existence of a pointer, and non-P-format, which means absence of a pointer) depending upon the CSI indication ("1", "0") of a cell having an even-numbered SC value (i.e., a cell whose SC value is 0, 2, 4 or 6). If the format is the P-format, for which CSI="1" holds, the value of the initial byte position (pointer field) of the SAR-PDU payload of the cell is the SDI pointer, and the remaining 46 bytes constitute the user information (FIG. 7A). The content set in the pointer is the offset, expressed in byte units using binary notation, from the end of the pointer field to the boundary (frame starting position) of the structured data. The payload ranges from the remaining 46 bytes of the SAR-PDU payload of this cell to the 47 bytes of the SAR-PDU of the next cell (i.e., a cell having an odd-numbered SN). Values of 0 to 93 can be set. FIG. 7A illustrates a case where the boundary of the structured data resides in a cell having an even-numbered SC value, and FIG. 7B illustrates a case where the boundary of the structured data resides in a cell having an odd-numbered SC value.

Thus, in accordance with the present invention, (1) when STS-3 frame data is converted to ATM cells and transmitted, the AAL-1 cell conversion zone is made the hatched portion in FIG. 3, as a result of which the transmission band can be reduced, and (2) the reference position of the cell conversion zone is specified using the SDT pointer of the AAL-1 cell, as a result of which the original STS-3 frame data can be reconstructed from received cells by the interface on the exit side of the ATM network. Section overhead and line overhead are generated independently. More specifically, in accordance with the present invention, an SDT pointer is used and the starting position of reduced data is placed in an ATM cell as information, thereby making it possible to reduce the required band (amount of information) while maintaining the STS-N format of the existing network.

(d) Necessity of Control for Fixing Level of Receive Buffer

The interface on the ATM-cell receiving side is internally provided with a receive buffer for storing received user information. The receive buffer is a play-out buffer provided for two purposes, namely (1) for clock transfer and (2) to accommodate fluctuations in cell arrival. Though a play-out buffer basically is a FIFO buffer, it possesses an initial fill level (IFL) and data cannot be read out of the buffer until data accumulates in the buffer up to the IFL. Through use of a receive buffer, generally a clock transfer is made from the data highway clock in an ATM switch to the clock of a line. The reason for this is that an ATM network usually operates with a common clock having a speed higher than line speed and cannot send data out to the line as is.

When an ATM cell is transferred within an ATM network, on the other hand, the arrival interval on the receiving side usually is not uniform even if ATM cells are transmitted at regular intervals. The reason for this is that the switching of ATM cells is not based upon fixed slot multiplexing such as in line switching but is instead based upon statistical multiplexing. That is, with statistical multiplexing, a transfer band for each line exists as far as probability is concerned and therefore a delay added on by the ATM switch takes on a value that differs cell by cell. A variation in amount of delay added onto cells is referred to as CDV (Cell Delay Variation). A tolerance value is decided in dependence upon the service type and class type, etc., of the ATM connection, and quality control is carried out in such a manner that the CDV value will fall within this tolerance value. When the interval at which cells arrive at the receive buffer is observed, therefore, the interval will vary within a fixed range. However, if observation is carried out over a comparatively long period of time, the frequency with which cells arrive will be a value decided by the line rate.

The initial fill level (IFL) of the receive buffer is set to a value that will enable the assumed (allowed) CDV to be accommodated. Specifically, the IFL is made a value such that:

the receive buffer will not be emptied if the ATM cell arrival interval is such that cells do not arrive over an assumed period of time; and the receive buffer will not overflow if the ATM cell arrival interval is such that too many cells arrive over an assumed period of time. In other words, it should be possible to tolerate a widening of the cell arrival interval with leeway from empty up to the IFL and to tolerate a narrowing of the cell arrival interval with leeway from the IFL to the maximum buffer capacity.

Though the quantity of cells which reside in a receive buffer usually fluctuates with the IFL serving as the center value, the average center value over a comparatively long period of time becomes the IFL. If the IFL is made sufficiently large in comparison with the assumed CDV and the buffer depth also is made sufficiently large, a correspondingly large leeway will be obtained and it will be possible to tolerate a CDV beyond what is expected. However, making the receive buffer larger than necessary lengthens the time necessary for cells to pass through the buffer and enlarges the CTD (Cell Transfer Delay) of the network transmission. Accordingly, the IFL and buffer depth are set to values just large enough to accommodate the assumed CDV.

Consider a situation where noise is picked up in the process of transferring a cell and that a P-format cell is mistaken for a non-P-format cell. The center value of the receive buffer in such case will become a value that is one octet larger than the IFL. The reason for this is that whereas the user data area possessed by a P-format cell is 46 octets, the user data area in the case of a non-P-format cell is 47 octets. Conversely, if a non-P-format cell is mistaken for a P-format cell for some reason, the center value of the receive buffer will become a value that is one octet smaller than the IFL. The problem in this case where a P-format cell (non-P-format cell) is interpreted as being a non-P-format cell (P-format cell) is that an event which will offset the shift in the level of the receive buffer and restore the level to what it was originally does not take place. This means that the shift accumulates whenever it occurs. If the P→non-P, non-P→P garbling occurs in alternating fashion, the above-mentioned problem will not arise but one cannot rely upon the chance that this will be the case. The problem will eventually manifest itself as a shift in the center value, i.e., as a decline in the ability to tolerate the CDV. Even though the value is within the assumed range of CDV values, starvation or overflow will occur.

Thus, it is necessary to exercise control in such a manner that the initial fill level (IFL) of the receive buffer will not fluctuate even if cell loss, erroneous cell insertion and cell garbling occur, and to so arrange it that the receive buffer will not experience starvation or overflow. According to the present invention, (1) an assumption is made that a P-format cell (an even-numbered cell for which the SC value is "1") always exists in one cycle (see the multiframe of FIG. 6) of SC values of 0 to 7, and (2) if a boundary of structured data does not exist in one cycle, a cell for which the SC value is 6 is forcibly adopted as a P-format cell and the SDT pointer value is made 127. (2) Furthermore, according to the present invention, an SN continuity and CRC check/parity check is performed and an indication as to whether a cell is valid/invalid or a dummy cell is added to the SNP field. As a result, if a P-format cell does not exist in one cycle, it can be assumed that a cell onto which the invalid-cell indication has been added or a cell onto which the dummy-cell indication has been added is a P-format cell. If two P-format cells exist in one cycle, it can be assumed that a cell having the valid-cell indication is a P-format cell. If a correct P-format cell can thus be assumed to be present in one cycle, then a P-format cell will no longer be judged to be a non-P-format cell and a non-P-format cell will no longer be judged to be a P-format cell. This makes it possible to prevent the IFL of a receive buffer from fluctuating and to prevent the loss of a large quantity of reproduced data.

(B) Interface on Entrance-side of ATM Network (a) Overall Construction

Figure 8:
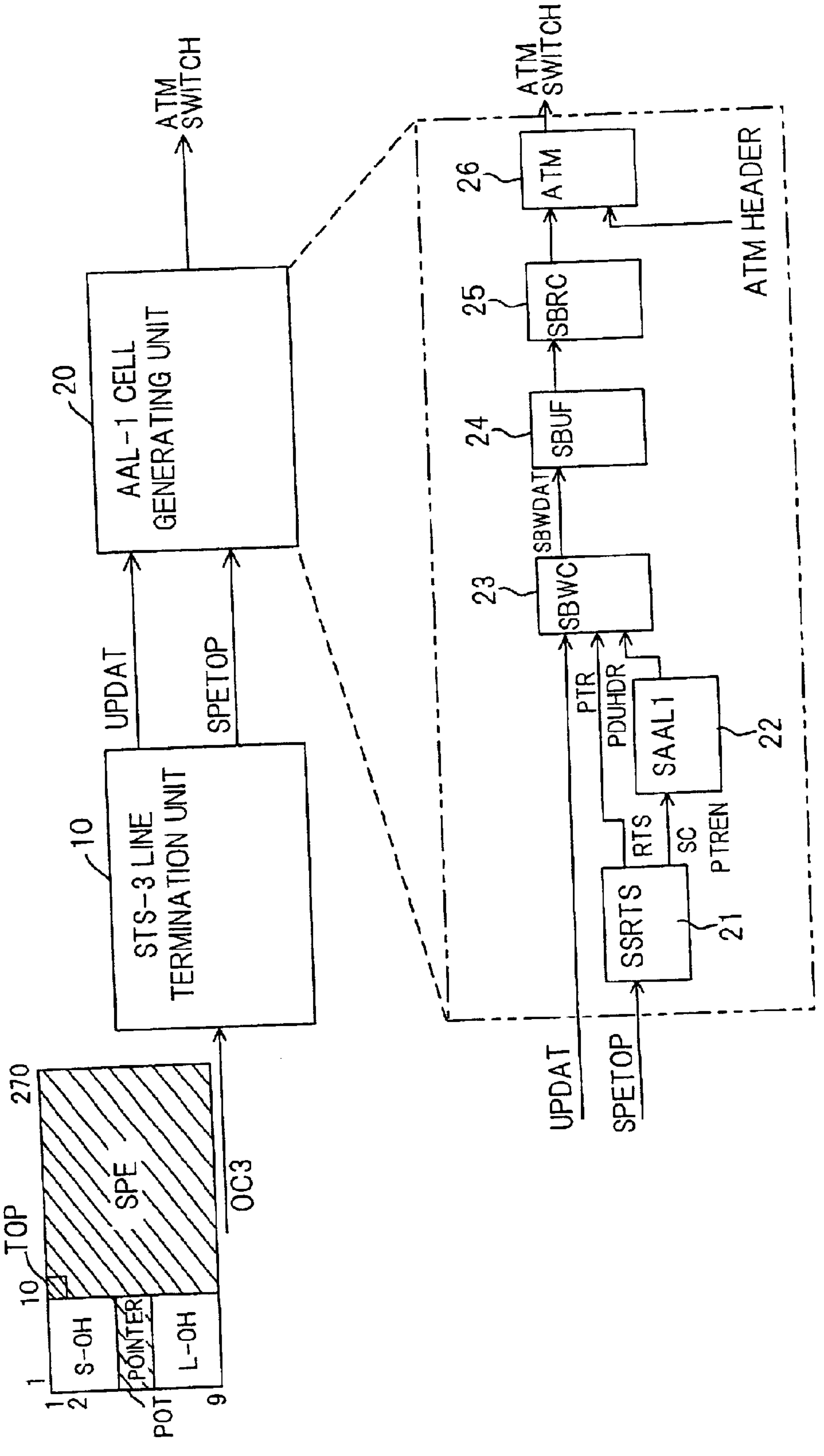
FIG. 8 is diagram showing the overall construction of an interface on the entrance side of an ATM network.

FIG. 8 is a diagram showing the overall construction of an interface on the entrance side of an ATM network. An STS-3 line termination unit 10 receives STS-3 frame data from an OC3 transmission line, outputs a signal SPETOP at the timing of the reference position TOP (the position of the byte at row 1, column 10) of the cell conversion zone in the frame, and outputs the pointer POT and payload SPE of the AAL-1 cell conversion zone (the hatched portion) as frame data UPDAT. An AAL-1 cell generating unit 20 converts the entering frame data UPDAT into AAL-1 cells, incorporates the SDT pointer, which indicates the reference position TOP, into a prescribed AAL-1 cell and sends the cell to an ATM network.

The AAL-1 cell generating unit 20 includes a signal creation unit (SSRTS) 21 for creating various signals such as an SDT pointer (PTR), a transmit signal RTS, an SC count value (SC) and a pointer-creation indication signal (PTREN); an SAR-PDU creation unit (SAAL1) 22 for creating an SAR-PDU header (PDUHDR) using the RTS information, SC count value and pointer-creation indication signal, etc.; a transmit-buffer write controller (SRWC) 23 for suitably selecting the SAR-PDU header (PDUHDR), SDT pointer (PTR) or frame data (UPDAT) and outputting the same as transmit-buffer write data (cell payload) SBWDAT; a transmit buffer (SBUF) 24, which comprises a FIFO buffer, for storing the 48-byte cell payload input thereto and successively outputting the same in response to a read-out request; a transmit-buffer read-out controller (SBRC) 25 for successively reading out and outputting the cell payload from the transmit buffer 24 in response to a request from an ATM cell creation unit; and an ATM cell creation unit (ATM) 26 for adding a 5-byte ATM header onto the cell payload, thereby creating an ATM cell, and sending the ATM cell to the ATM network.

(b) Signal Creation Unit 21

Figure 9:
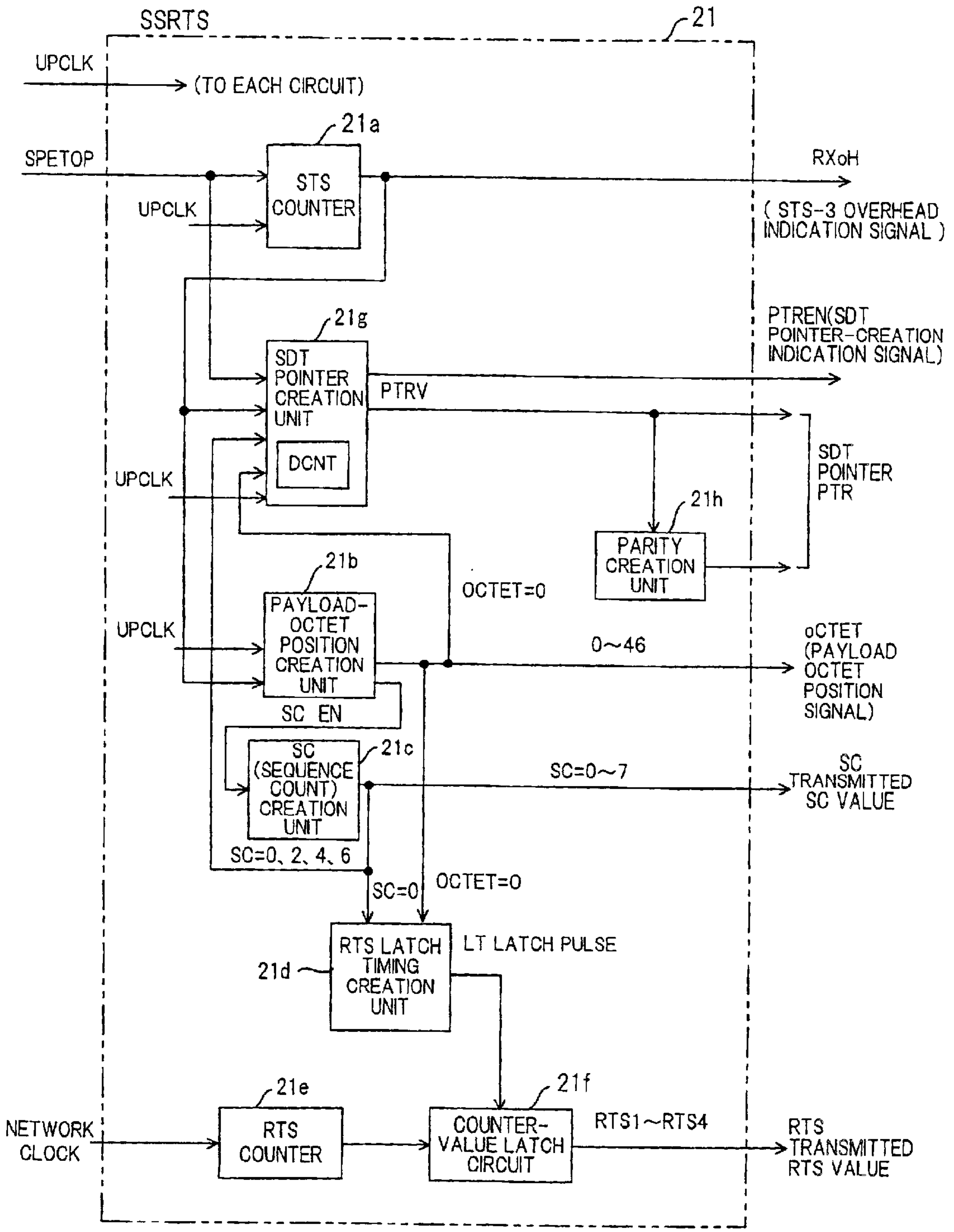
FIG. 9 is a diagram illustrating a unit for creating various signals.
Figure 10:
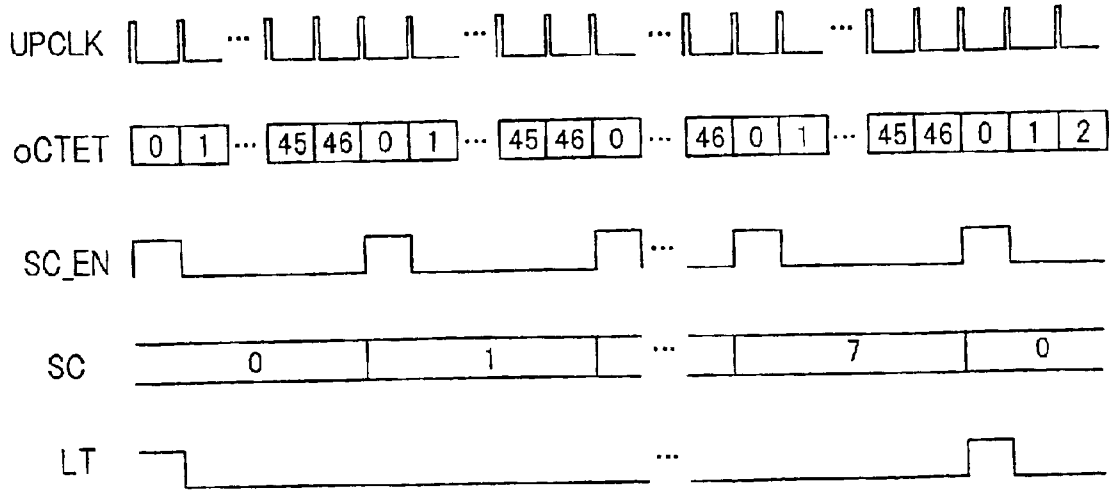
FIG. 10 is a diagram showing the timings of various signals.

FIG. 9 is a diagram illustrating the construction of the signal generation unit 21 and FIG. 10 is a timing chart of the various signals. The reference-position signal SPETOP from the STS-3 line termination unit 10 and a master clock (byte timing pulse) UPCLK of the line on the upstream side enter the signal generation unit 21, and so does a 155.52-Mbps network clock, which is for RTS operation, that arrives from the ATM network.

An STS counter 21*a* is a counter that indicates each of 2430 (=9×270) byte positions in an STS-3 frame (see FIG. 11). (1) The STS counter 21*a* is preset to a numerical value of 9 by the reference-position signal SPETOP, (2) counts the byte timing pulses UPCLK and (3) outputs an STS-3 overhead indication signal RXOH, which takes on the logical "1" value at the byte positions of the section overhead SH and line overhead LH.

A payload-octet position creation unit 21*b* outputs the octet positions (0~46) of the SAR-PDU payload. More specifically, the payload-octet position creation unit 21*b* counts the byte timing pulses UPCLK (FIG. 10) in the AAl-1 cell conversion zone indicated by the bold border in FIG. 12 (namely when the STS-3 overhead indication signal RXOH is logical "0") and outputs the octet position (0~46) of the SAR-PDU payload as a signal OCTET. The payload-octet position creation unit 21*b* further outputs an SC enable signal (SCEN) whenever the numerical value OCTET becomes zero. A sequence count creation unit 21*c* counts the SC enable signal SCEN and outputs the sequence count (SC) of 0~7. An RTS latch timing creation unit 21*d* outputs a latch pulse LT at OCTET=0 and SC=0, a 4-bit RTS counter 21*e* counts the network clock cyclically, and a counter-value latch circuit 21*f* latches and outputs, as the transmit RTS information RTS1~RTS4, the content (four bits) of the RTS counter 21*e* prevailing when the latch pulse LT is generated.

Figure 13:
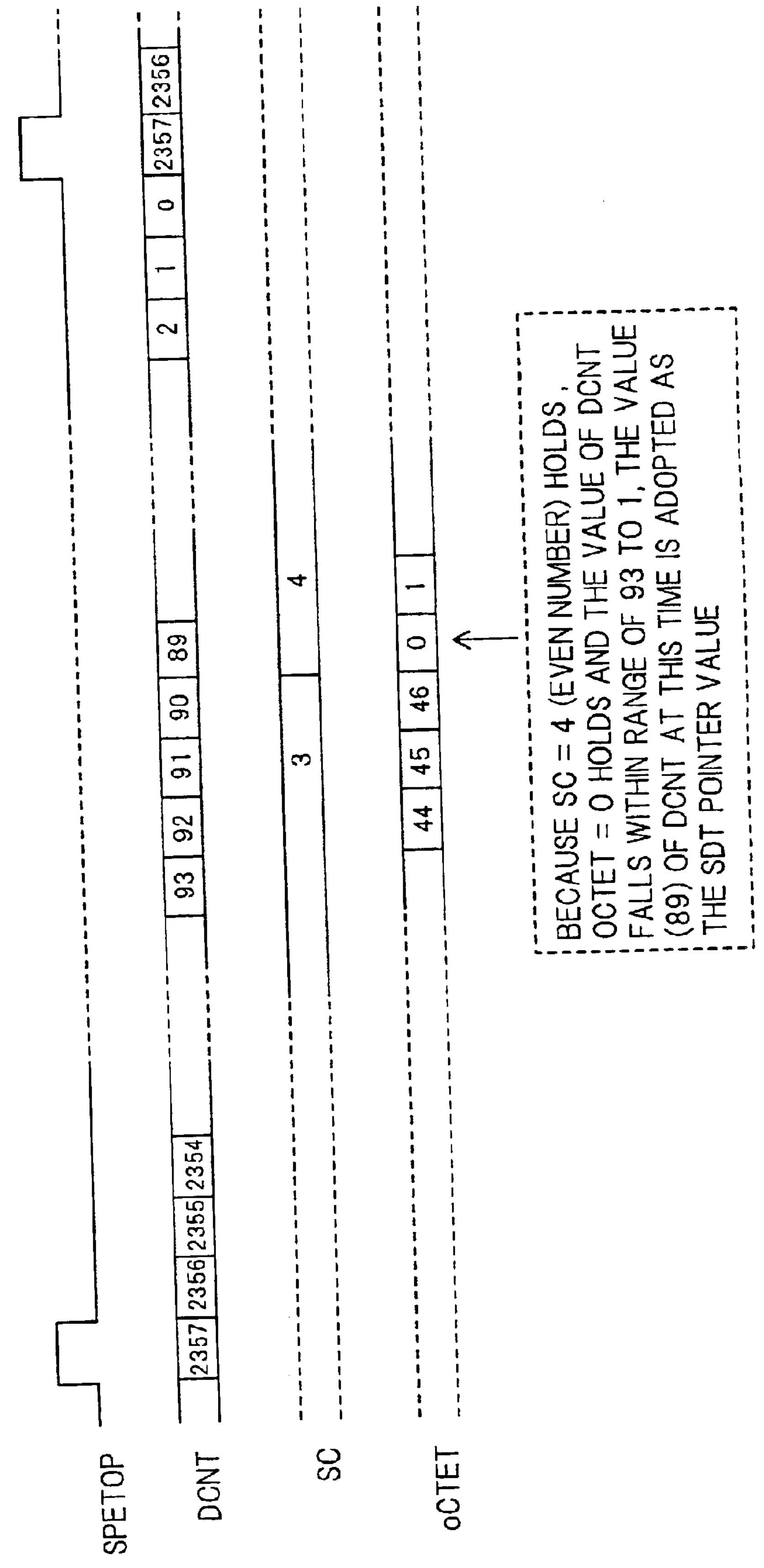
FIG. 13 is a diagram useful in describing the generation of an STD pointer.

An SDT pointer creation unit 21*g* has a downcounter DCNT for indicating each of 2358 byte positions in the AAL-1 cell conversion zone (the area enclosed by the border in FIG. 12) of the STS-3 frame. The downcounter DCNT (1) is preset to the numerical value 2357 by the reference-position signal SPETOP and (2) is decremented whenever the byte timing pulse UPCLK is generated in the AAl-1 cell conversion zone (namely when the STS-3 overhead indication signal RXOH is logical "0"), thereby outputting 2357~0 repetitively. If the numerical value is 93~1 when the sequence count value SC is an even number and payload octet position signal OCTET=0 holds, then the SDT pointer creation unit 21*g* outputs this numerical value as an SDT pointer value PTRV and outputs the pointer-creation indication signal PTREN. FIG. 13 is a diagram useful in describing SDC pointer generation. Since the value in the downcounter DCNT lies in the range 93~1 when SC=4 (even number) and OCTET=0 hold, the value at this time (=89) is output as the SDT pointer value PTRV. A parity creation unit 21*h* creates even-numbered parity of the SDT pointer value. An 8-bit SDC pointer is constructed by the 7-bit SDT pointer value PTRV and 1-bit parity.

As mentioned above, the SDT pointer creation unit 21*g* decides an SDT pointer to indicate which cell of one cycle (SC=0~7) is to serve as a P-format cell and then calculates the SDT pointer to be applied. Specifically, the following rule is observed to generate the SDT pointer:

(1) An AAL-1 cell (P-format cell) having an SDT pointer always appears only once in one cycle, where SC values of 0 to 7 constitute one cycle.

(2) Only an AAL-1 cell for which SC is an even number (0, 2, 4, 6) can be a P-format cell. Further, the SDT pointer can take on values of 0 to 93 and 127.

(3) When the current cycle is devoid of a structured-data boundary and the beginning of the payload of the cell for which SC=0 holds in the next cycle also is not a structured-data boundary, the cell for which SC=6 holds in the current cycle becomes the P-format cell and the SDT pointer value is "127" (all "1"s).

(4) When a structured-data boundary exists at the beginning of the payload of the cell for which SC=0 holds, the cell for which SC=0 holds becomes the P-format cell and the SDT pointer value is "0". When a structured-data boundary does not exist in the immediately preceding cycle in this case, the cell for which SC=6 holds in the immediately preceding cycle becomes the P-format cell and the SDT pointer value becomes "93".

(5) When a structured-data boundary exists at the beginning of the payload of a cell for which SC=2 (or 4, 6) holds, the cell for which SC=2 (or 4, 6) holds becomes the P-format cell and the SDT pointer value becomes "93".

(c) SAR-PDU Header Creation Unit (SAAL1) 22

Figure 14:
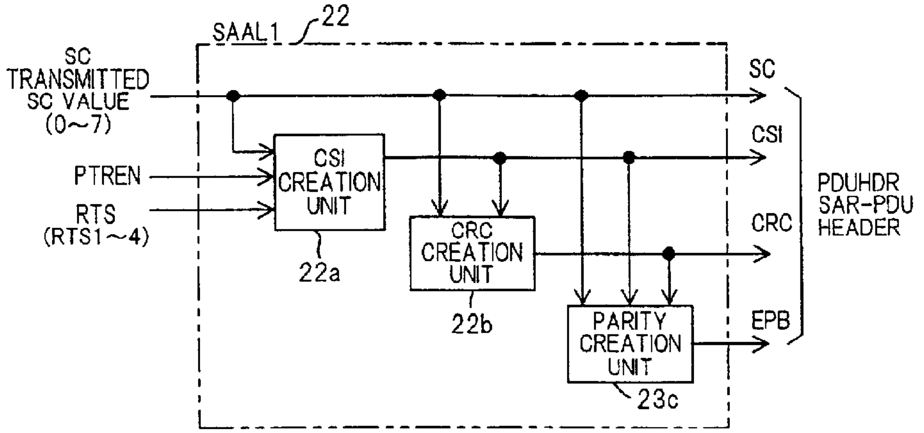
FIG. 14 is a diagram illustrating a unit for creating an SAR-PDU header.

FIG. 14 is a diagram illustrating the construction of the SAR-PDU header creation unit 22. A CSI creation unit 22*a* (1) outputs CSI=RTS information (RTS1~RTS4) when the sequence count SC (0~7) is an even number; (2) outputs CSI="1" if the SDR pointer-creation indication signal PTREN is "1" when the SC value is an odd number; (3) and outputs CSI="0" if the SDR pointer-creation indication signal PTREN is "0" when the SC value is an odd number. A CRC creation unit 22*b* creates a 3-bit CRC in accordance with a predetermined CRC calculation equation using the SN field (CSI+SC), and a parity creation unit 23*c* creates even-numbered parity EPB for the seven bits of (CSI+SC+CRC). The SAR-PDU header creation unit 22 outputs CSI, SC, CRC and EPB as the SAR-PDU header (PDUHDR) cell by cell.

(d) Transmit-buffer Write Controller 23

Figure 15:
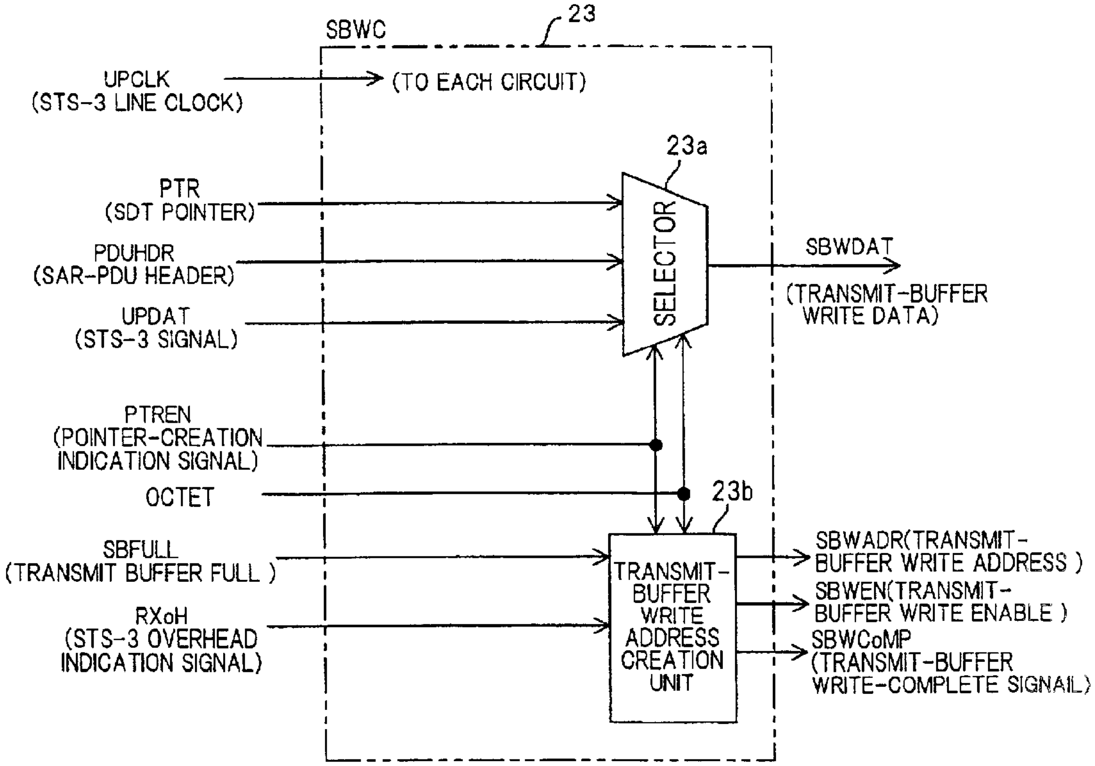
FIG. 15 is a diagram illustrating a transmit-buffer write controller.

FIG. 15 is a diagram showing the construction of the transmit-buffer write controller 23. A selector 23*a* suitably selects the SAR-PDU header (PDUHDR), SDT pointer PTR or STS-3 frame data UPDAT based upon the payload octet position signal OCTET and pointer-creation indication signal PTREN. As a result, the selector 23*a* sends transmit-buffer write data (cell payload) to the transmit buffer 24. A transmit-buffer write address creation unit 23*b* controls the generation of an address (SBWADR) for writing a cell payload to the transmit buffer and the generation of a write-enable signal (SBWEN). More specifically, (1) when transmit buffer full SBFULL="1" holds at the payload octet position OCTET=0 (start timing of the SAR-PDU), the transmit-buffer write address creation unit 23*b* regards this as transmit-buffer overflow and does not write data to the transmit buffer. (2) When transmit buffer full SBFULL="0" holds at the payload octet position OCTET=0, the transmit-buffer write address creation unit 23*b* generates the write-enable signal (SBWEN) and writes data to the transmit buffer. (3) The transmit-buffer write address creation unit 23*b* halts the write operation in a period of time corresponding to an AAL-1 cell conversion byte indicated by the STS-3 overhead indication signal RXOH="1". (4) When writing of data has started, the transmit-buffer write address creation unit 23*b* outputs a write-completion signal SBWCOMP at the timing of OCTET=46.

(e) Transmit Buffer

Figure 16:
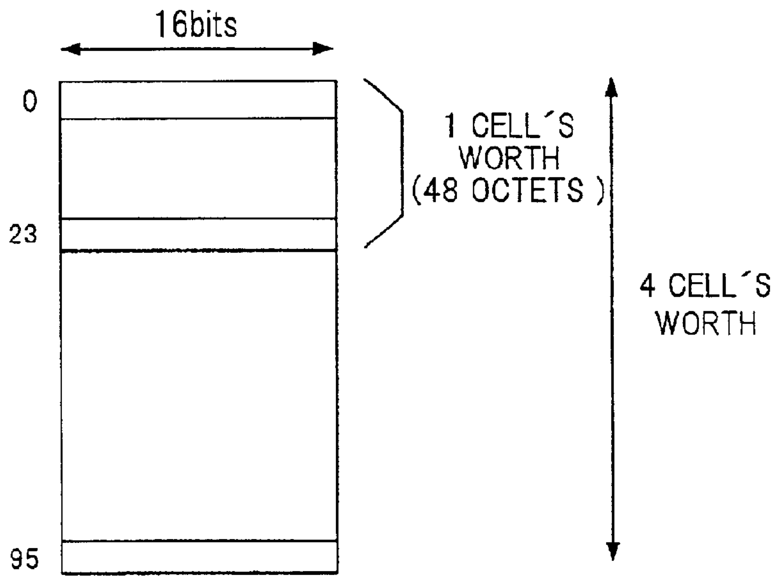
FIG. 16 is a diagram showing the structure of a transmit buffer.
Figure 17A:
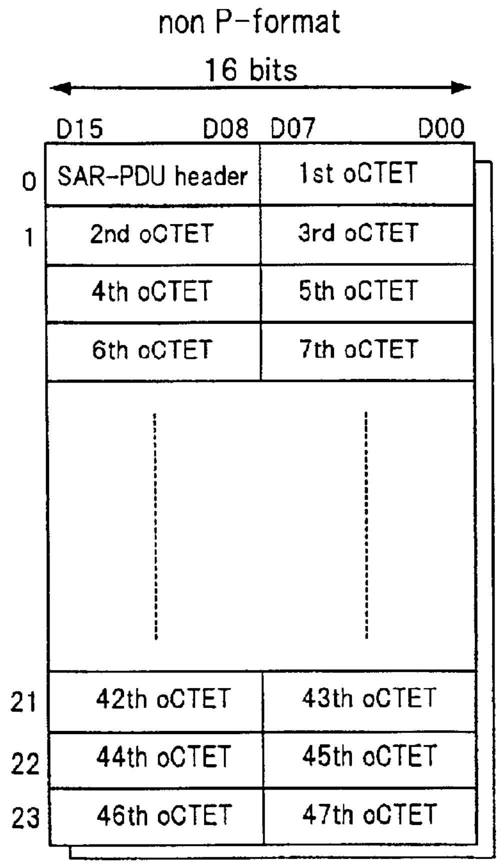
FIGS. 17A, 17B are diagrams useful in describing the mapping of SAR-PDU to a transmit buffer.
Figure 17B:
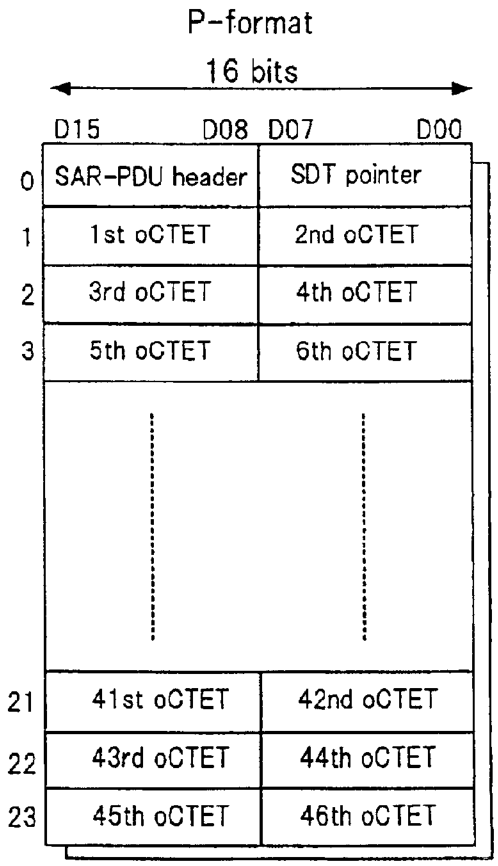

FIG. 16 is a diagram showing the construction of the transmit buffer 24, which is constituted by an FIFO buffer and is capable of storing a maximum of four cells. A cell payload in the non-P-format is mapped to the transmit buffer in the manner shown in FIG. 17A, and cell payload data in the P-format is mapped to the transmit buffer in the manner shown in FIG. 17B.

(f) Transmit-buffer Read-out Controller 25

Figure 18:
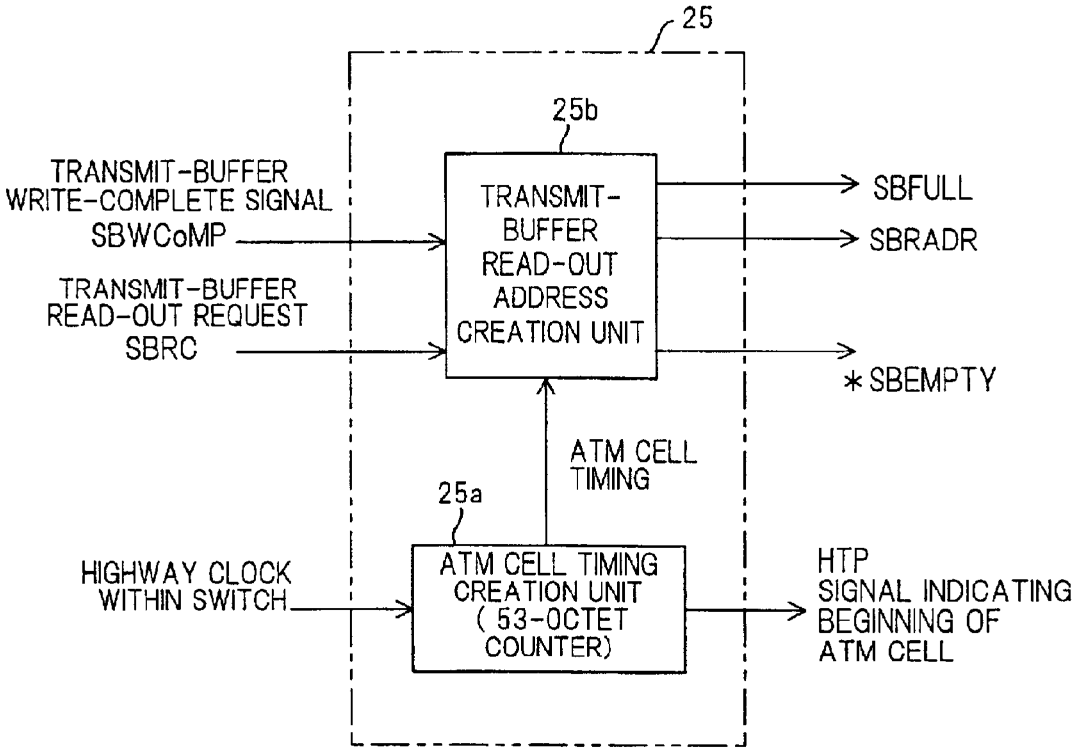
FIG. 18 is a diagram illustrating a transmit-buffer read-out controller.

FIG. 18 is a diagram illustrating the construction of the transmit-buffer read-out controller 25. An ATM cell timing creation unit (53-octet counter) 25*a* drives the 53-octet counter by the highway clock within the switch and creates a 53-octet signal HTP that indicates the beginning of the ATM cell. A transmit-buffer readout address creation unit 25*b* (1) generates a read-out address SBRADR for the transmit buffer 24 based upon the ATM cell timing, and (2) creates the transmit buffer full signal SBFULL and a transmit-buffer non-empty signal (reverse logic of transmit-buffer empty)*SBEMPTY based upon the write-completion signal SBWCOMP from the transmit-buffer write controller 23 and a read-out request SBRC from the ATM cell creation unit 26.

The transmit buffer 24 is a FIFO buffer for a maximum of four cells, as mentioned above. The transmit-buffer read-out controller 25 monitors the amount of use of this buffer to thereby detect transmit-buffer overflow, inhibit the writing of data anew (i.e., discard data that the apparatus is attempting to write in) and notify of the occurrence of overflow. A pointer is used to manage the amount of buffer used. A write pointer (SBW_PTR) and a read-out pointer (SBR_PTR) are provided internally as the pointers. Both pointers can take on values of 0 to 3. The particular value indicates the logical address (in cell-payload units) of the transmit buffer.

The trigger that advances the write pointer SBW_PTR is entry of the write-completion signal SBWCOMP from the transmit-buffer write controller 23. The trigger that advances the read-out pointer SBR_PTR is entry of the read-out request SBRC from the ATM cell creation unit 26; this is the time at which read-out processing is completed. Furthermore, there are two buffer states, namely transmit-buffer empty SBEMPTY and transmit-buffer full SBFULL, which indicate that the transfer buffer is empty and full, respectively, when their logic values are "1". The ATM cell creation unit 26 issues the read-out request command SBRC if the transmit buffer is not empty (*SBEMPTY="1") at the timing at which the output of the transmit buffer 24 is accepted.

By using the above-mentioned pointers, the transmit-buffer read-out address creation unit 25*b* manages the amount of transmit-buffer use as follows:

(1) When the read-out request SBRC is received, the address creation unit 25*b* starts read-out processing based upon the read-out pointer SBR_PTR. The address creation unit 25*b* advances the read-out pointer SBR_PTR at completion of read-out and resets transmit-buffer full SBFULL to 0 if SBFULL=1 holds at this time. The address creation unit 25*b* compares the read-out pointer SBR_PTR after the updating thereof and the write pointer SBW_PTR. If SBR_PTR=SBW_PTR holds, the transmit buffer 24 is emptied by the current read-out; the next read-out cannot be allowed under these conditions. Accordingly, *SBEMPTY=0 is set. As a result, the read-out request SBRC no longer arrives from the ATM cell creation unit 26.

(2) When the write-completion notification signal SBWCOMP is received, the transmit-buffer read-out address creation unit 25*b* advances the write pointer SBW_PTR. If transmit-buffer parity SBEMPTY=1 holds at this time, SBEMPTY is reset to 0. The address creation unit 25*b* compares the write pointer SBW_PTR after the updating thereof and the read-out pointer SBR_PTR. If SBW_PTR=SBR_PTR holds, this indicates that the transmit buffer 24 was filled by the current writing of data; writing of the next cell payload cannot be allowed under these conditions. Accordingly, transfer-buffer full SBFULL=1 is set.

(g) ATM Cell Creation Unit 26

Figure 19:
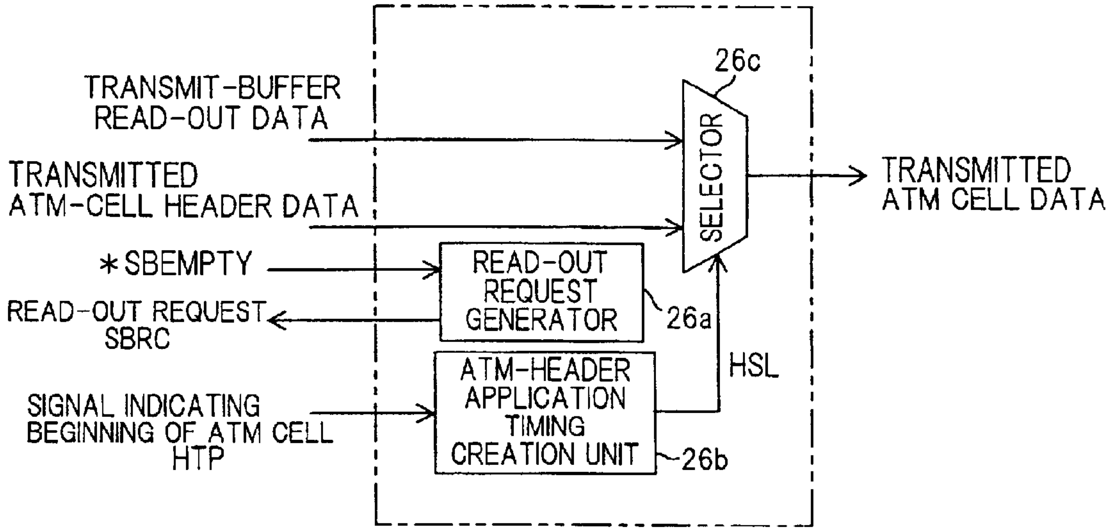
FIG. 19 is a diagram illustrating the structure of an ATM cell creating unit.

FIG. 19 is a diagram showing the construction of the ATM cell creation unit 26. A read-out request generator 26*a* sends the read-out request SBRC to the transmit-buffer read-out controller 25 when the transmit buffer 24 is not empty. An ATM-header application timing creation unit 26*b* outputs a header selection signal HSL based upon the signal HTP indicating the beginning of the ATM cell. A selector 26*c* selects and outputs the ATM cell header if header selection signal HSL is "1" and selects and outputs transmit-buffer readout data (the cell payload) at all other timings.

(B) Interface on Exit-side of ATM Network

Figure 20:
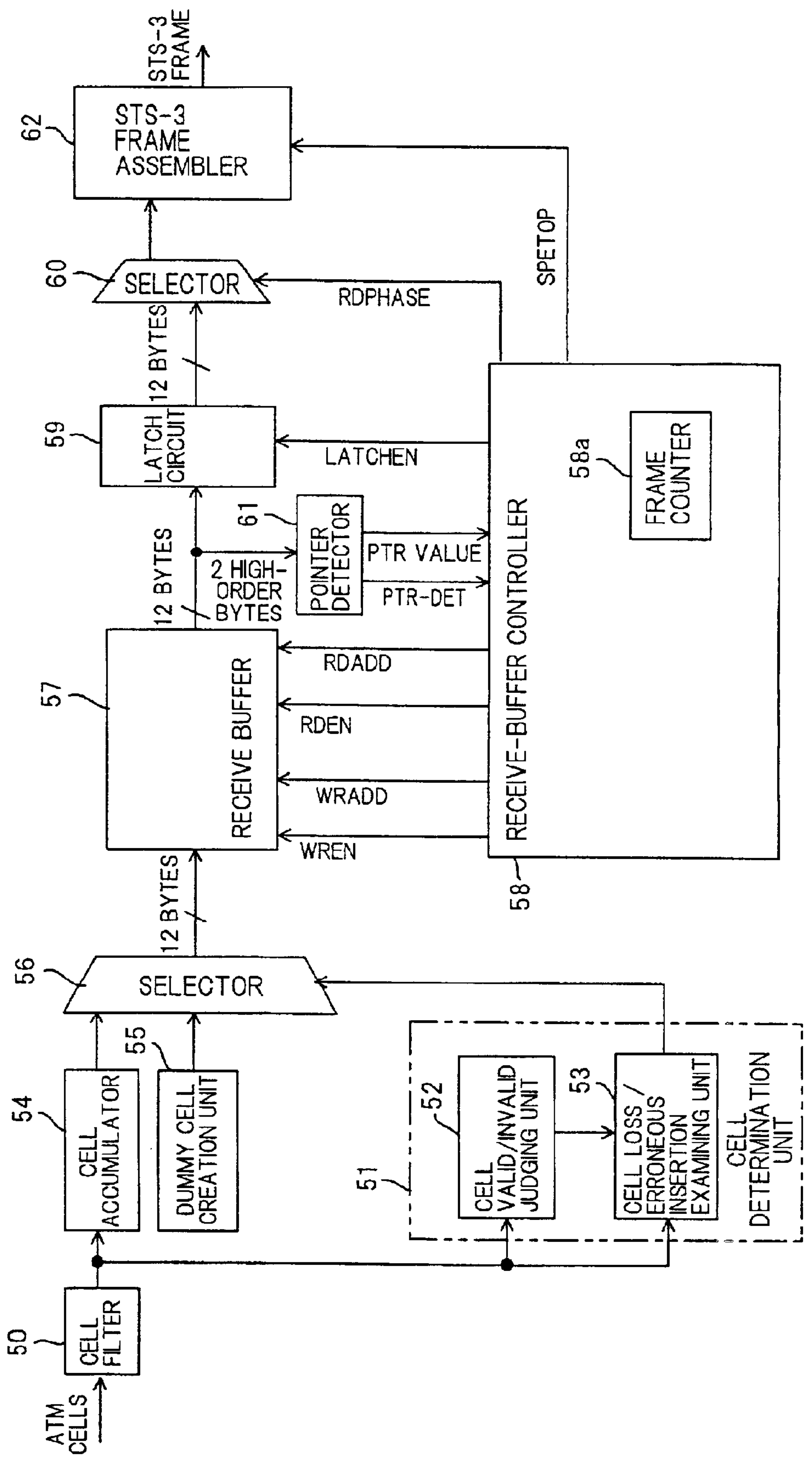
FIG. 20 is diagram showing the overall construction of an interface on the exit side of an ATM network.

FIG. 20 is a diagram showing the overall construction of an interface on the exit side of an ATM network. A cell filter 50 subjects cells that enter from an ATM highway to filtering based upon VPI/VCI values and selects/passes cells that it itself is to process. A cell determination unit 51 has a cell valid/invalid judging unit 52 and a cell loss/erroneous insertion examining unit 53. The cell valid/invalid judging unit 52 checks the SN/SNP field of the SAR-PDU header of each individual cell that has passed through the cell filter 50, i.e., performs a CRC check and parity check concerning each cell and judges the normality of the SAR-PDU header information. A 1-bit error of the CRC is capable of being corrected and is corrected. The result of the cell valid/invalid judgment is "valid" or "invalid" and is reported to the cell loss/erroneous insertion examining unit 53. An "invalid" judgment means that an SAR-PDU header has been received but cannot be trusted.

In accordance with a sequence-number check algorithm (SN check algorithm), the cell loss/erroneous insertion examining unit 53 checks for loss and erroneous insertion of cells based upon the judgment made by the cell valid/invalid judging unit 52 and the continuity of the sequence count SC in the SN field and, on the basis of the check, decides to load a received cell into a receive buffer 57 or to discard the cell or, if cell loss has been determined, to insert a dummy cell.

Figure 21A:
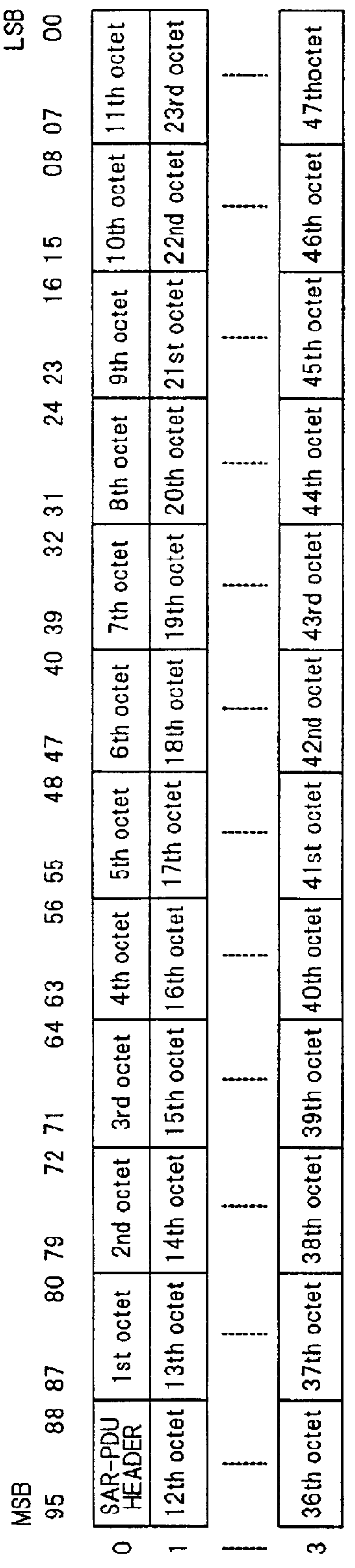
FIGS. 21A, 21B are diagrams useful in describing writing to a receive buffer and read-out from the receive buffer.

A cell accumulator 54 stores temporarily a cell which the cell loss/erroneous insertion examining unit 53 is currently examining to determine whether or not it should be introduced to the receive buffer. If the cell loss/erroneous insertion examining unit 53 has decided that cell loss has occurred, a dummy cell creation unit 55 creates and outputs the data of the dummy cell that corresponds to the lost cell. On the basis of the decision made by the cell loss/erroneous insertion examining unit 53 to load a cell, discard a cell or insert a dummy cell, a selector 56 selects and outputs a cell from the cell accumulator 54 or a dummy cell from the dummy cell creation unit 55. Further, the selector 56 divides a 48-byte cell payload into 12 bytes four times in parallel fashion and assembles these bytes as shown in FIG. 21A, whereupon the payload is input to the receive buffer 57.

The receive buffer 57 is a play-out buffer provided for two purposes, namely (1) for clock transfer and (2) to accommodate fluctuations in cell arrival. The receive buffer 57 has a capacity for storing a prescribed number of cell payloads (SAR-PDU header+47-byte information).

A receive-buffer controller 58 outputs a write-enable signal WREN, a write address signal WRADD, a read-out-enable signal DREN, a read-out address signal RDADD, a latch-enable signal LATCHEN, a select signal RDPHASE and the reference-position signal SPETOP. More specifically, the receive-buffer controller 58 holds the write address signal WRADD, generates the write-enable signal WREN whenever data is output from the selector 56, synchronizes this data to the write clock, writes this data to the receive buffer 57 and increments the write address signal WRADD. As long as the receive buffer 57 is not empty, data is read out of the receive buffer continuously in sync with the read-out clock.

When write is enabled (WREN="1"), the receive buffer 57 writes the SAR-PDU data 12 bytes at a time to the address designated by the write address signal WRADD. When read-out is enabled (RDEN="1"), the receive buffer 57 reads out the SAR-PDU data 12 bytes at a time from the address designated by the read-out address signal RDADD. If latch-enable LATCHEN="1" holds, a latch circuit 59 latches data read out of the receive buffer and continues outputting latched data to a selector 60 constantly.

A pointer detector 61 detects the SDT pointer PTR from the two high-order bits of the payload read out of the receive buffer 57 and inputs a pointer value and a pointer-detection signal PTR-DET to the receive-buffer controller 58. The latter is internally provided with a frame counter 58*a* that counts from 0 to 2429 for the purpose of counting 2430 bytes of an STS-3 frame. The frame counter 58*a* is preset to [2429—pointer value] when a pointer is detected and then starts counting up at the byte timing. The receive-buffer controller 58 outputs the reference-position signal SPETOP at the time at which counted value becomes equal to 9, namely at the timing of the frame reference position TOP (the starting position of the AAL-1 cell conversion zone).

Figure 21B:
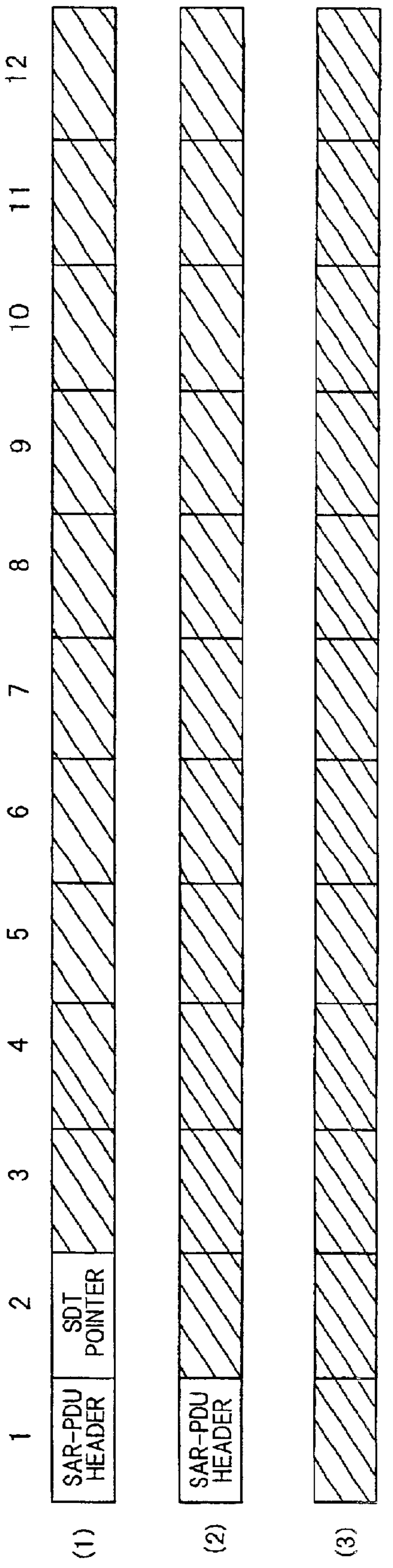

The receive-buffer controller 58 outputs the select signal RDPHASE, which specifies which byte output from the latch circuit 59 is to be delivered as an output. More specifically, depending upon whether or not the pointer-detection signal PTR-DET has been applied thereto, the receive-buffer controller 58 determines whether data that has been read out of the receive buffer 57 is the cell payload of a P-format cell or the cell payload of a non-P-format cell. In addition, (1) if the input to the selector 60 is data of the 12 most significant bytes of a cell payload and the second byte is the SDT pointer [see (1) in FIG. 21B], then the receive-buffer controller 58 outputs the select signal RDPHASE so as to select ten bytes starting from the third byte;

(2) if the input to the selector 60 is data of the 12 most significant bytes of a cell payload and the second byte is user data [see (2) in FIG. 21B], then the receive-buffer controller 58 outputs the select signal RDPHASE so as to select 11 bytes starting from the second byte;

(3) if the input to the selector 60 is data other than data of the 12 most significant bytes of a cell payload [see (3) in FIG. 21B], then the receive-buffer controller 58 outputs the select signal RDPHASE so as to select 12 bytes starting from the first byte; and (4) during the period of time over which an STS-3 frame assembler 62 generates section overhead SH and line overhead LH, the receive-buffer controller 58 sets the select signal RDPHASE to "0000" to cause dummy data "00000000" to be output from the selector 60.

Thus, the selector sends the user data indicated by the hatching in FIG. 21B to the STS-3 frame assembler 62 at the byte timing of the AAL cell conversion zone and outputs dummy data in the overhead interval.

The STS-3 frame assembler 62 assembles the user data, which enters from the selector 60 at the byte timing of the AAL cell conversion zone, into the STS-36 frame format, creates the section overhead SH and line overhead LH at the overhead byte timing, embeds the created overhead in the overhead field to complete the STS frame data and then sends this data to the STS-3 transmission line.

(C) First Embodiment of Interface Having Band Adjustment Function

The data that has been read out of the receive buffer 57 is subjected to a band adjustment. By assuming that a dummy cell or invalid cell, which was presumed to be a P-format cell, is a P-format cell, the band adjustment prevents loss of a large quantity of reproduced data due to loss of a P-format cell and prevents the initial fill level (IFL) of the receive buffer from fluctuating.

Figure 22:
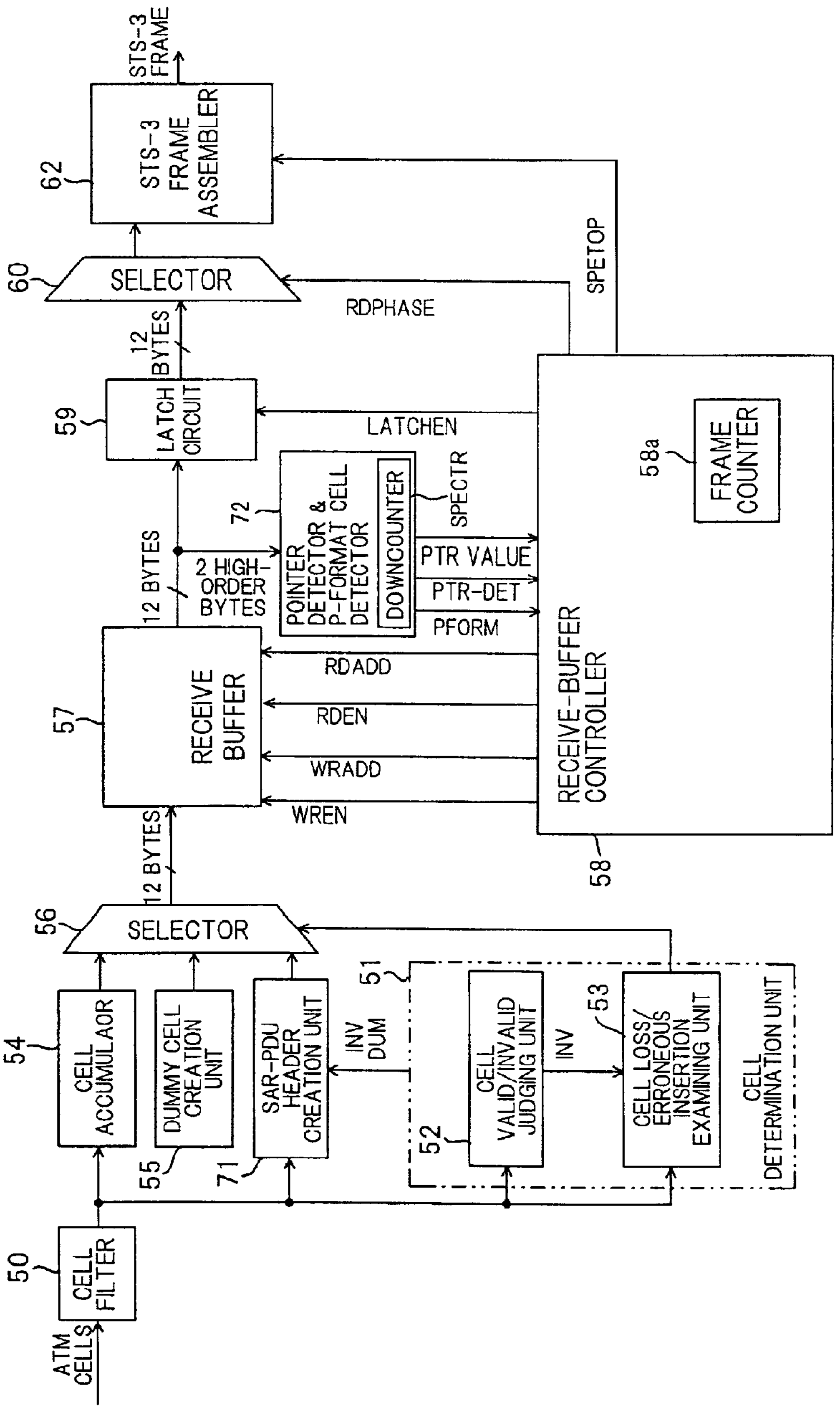
FIG. 22 is a diagram showing the construction of an interface provided on the exit side of an ATM network and having a band adjustment function.

FIG. 22 is a diagram showing the construction of an interface provided on the exit side of an ATM network and having a band adjustment function. Components identical with those shown in FIG. 20 are designated by like reference characters. This arrangement differs in that (1) an SAR-PDU header creation unit 71 is provided; (2) the cell determination unit 51 outputs a cell-header valid/invalid determination signal INV and a dummy-cell data insertion signal DUM; and (3) the pointer detector 61 is replaced by a pointer detector/P-format cell detector 72.

The cell valid/invalid judging unit 52 subjects each individual cell that has passed through the cell filter 50 to a CRC check and parity check, judges the normality of the SAR-PDU header information and outputs the cell-header valid/invalid determination signal INV. INV="0" signifies "valid" and INV="1" signifies "invalid", i.e., the fact that an SAR-PDU header has been received but appears to be erroneous.

In accordance with an SN check algorithm, the cell loss/erroneous insertion examining unit 53 checks for loss and erroneous insertion of cells based upon the judgment made by the cell valid/invalid judging unit 52 and the continuity of the sequence count SC in the SN field and, on the basis of the check, decides to load a received cell into the receive buffer 57 or to discard the cell or, if cell loss has been determined, to insert a dummy cell. In a case where a dummy cell is inserted, the dummy insertion signal DUM (in which "0" indicates "normal" and "1" indicates "dummy insertion") is output.

Figure 23:
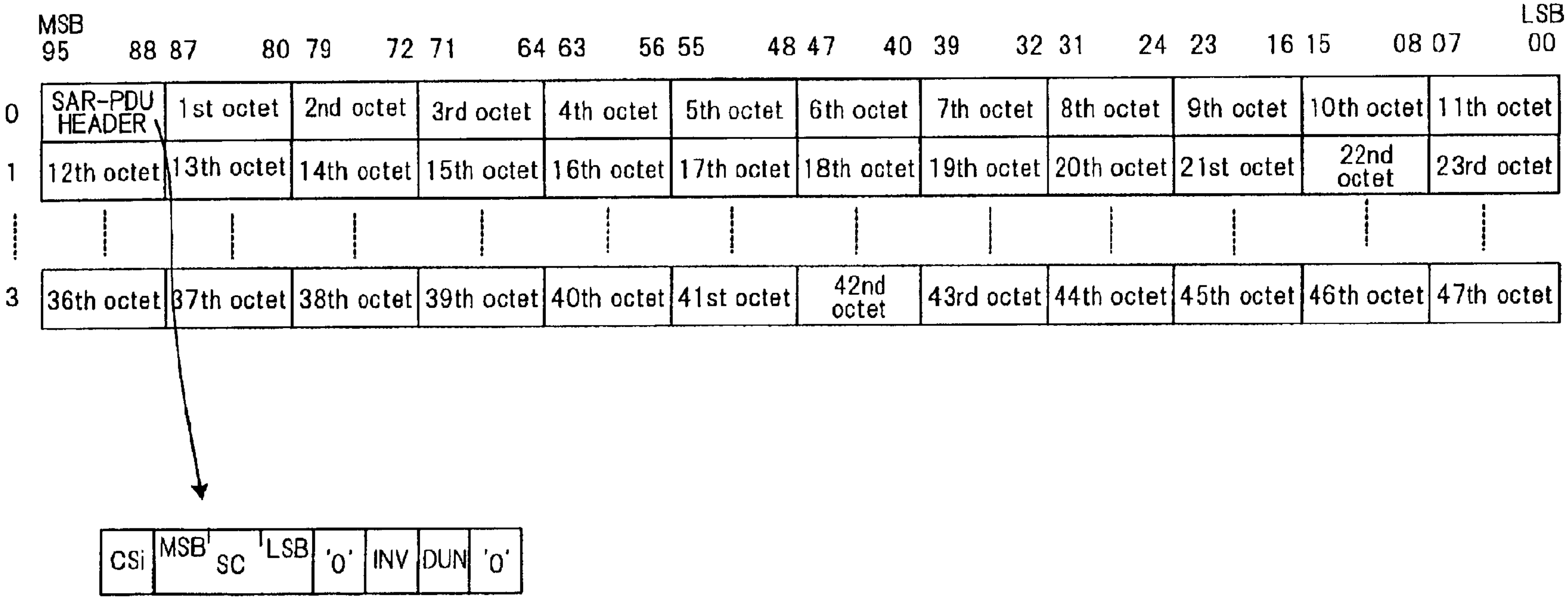
FIG. 23 is a diagram useful in describing the output of a selector.

The SAR-PDU header creation unit 71 creates the SAR-PDU header shown in FIG. 23 using CSI, SC contained in the SAR-PDU header that enters from the cell filter 50 as well as the cell-header valid/invalid determination signal INV and dummy insertion signal DUM that enter from the cell determination unit 51.

(1) When INV="0", DUM="0" hold, and when INV="1", DUM="0" hold, the selector 56 selects and outputs, 12 bytes at a time, the total of one byte of SAR-PDU data that has been created by the SAR-PDU header creation unit 71 and 47-byte cell-payload data from the second byte onward that has been stored in the cell accumulator 54 (see FIG. 23). (2) When INV="1", DUM="1" hold, the selector 56 selects and outputs, 12 bytes at a time, the total of one byte of SAR-PDU data that has been created by the SAR-PDU header creation unit 71 and 47-byte dummy data that has been generated by the dummy cell creation unit 55.

Figure 24:
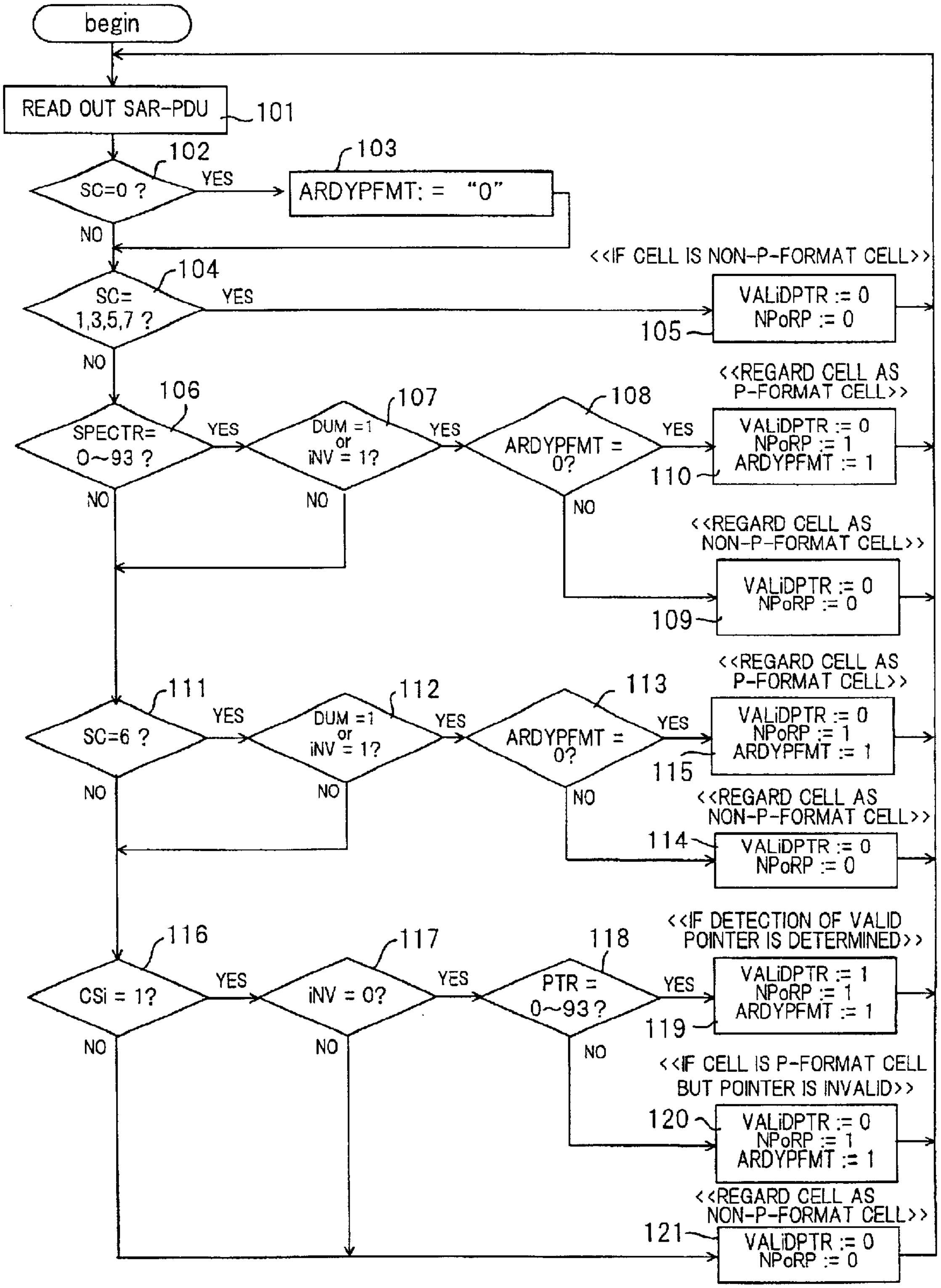
FIG. 24 is a flowchart illustrating processing for detecting pointers and judging P-format cells.

The pointer detector/P-format cell detector 72 is internally provided with a downcounter SPECTR that counts from 2357 to 0 to indicate 2358 byte positions (see FIG. 12) of the AAL-1 cell conversion zone. The downcounter SPECTR is preset to the pointer value at the time of pointer detection, after which the downcounter counts down cyclically at the byte timing of the AAL-1 cell conversion zone. Using the two high-order bits of the cell payload read out of the receive buffer 57 and the value of the count in the downcounter SPECTR, the pointer detector/P-format cell detector 72 executes pointer-detection/P-format determination processing, which is illustrated in FIG. 24, and outputs (1) the SDT pointer value (PTR value) and pointer-detection signal PTR-DET and (2) outputs a P-format cell determination signal PFORM.

In the flow of processing for pointer detection and P-format cell determination, the pointer detector/P-format cell detector 72 reads an SAR-PDU header (step 101) and checks to see whether sequence count SC=0 holds (step 102). If SC=0 holds ("YES" at step 101), a P-format cell detection signal ARDYPFMT is reset to "0" (step 103). The P-format cell detection signal ARDYPFMT is a signal that is reset to "0" at the beginning of one cycle of SC values 0 to 7; at detection of a P-format cell, the signal takes on the "1" level until it is reset.

Next, it is determined whether SC=1, 3, 5 or 7 holds (i.e., whether SC is odd) (step 104). If the SC is odd ("YES" at step 104), then the cell is a non-P-format cell. Accordingly, the operations VALIDPTR="0", NPORP="0" are performed (step 105) and control returns to the beginning. VALIDPTR is a pointer detection signal that rises to logical "1" when a true SDT pointer has been detected, and NPORP is a signal that rises to logical "1" when a P-format cell has been detected.

If the SC is not odd ("NO" at step 104), it is determined whether the count in the downcounter SPECTR is a value in the range 0 to 93 at the starting octet position of the cell payload (step 106). If the value of the count falls within the range of 0 to 93 ("YES" at step 106), it is determined whether cell-header valid/invalid determination signal INV="1" holds or whether dummy insertion signal DUM="1" holds (step 107). If either INV or DUM is "1" ("YES" at step 107), it is determined whether the P-format cell detection signal ARDYPFMT is "1" (step 108). If ARDYPFMT="1" holds ("NO" at step 108), this means that a P-format cell has already been detected and therefore the operations VALIDPTR="0", NPORP="0" are performed (step 109). If ARDYPFMT="0" holds ("YES" at step 108), this means that a P-format cell has not yet been detected and therefore it is assumed that a cell for which the SC value is even was the P-format cell. The operations VALIDPTR="0", NPORP="1", ARDYPFMT="1" are performed (step 110) and control returns to the beginning.

If it is found at step 106 the count in the downcounter SPECTR is not a value in the range 0 to 93 ("NO" at step 106) or if it is found at step 107 that INV="0", DUM="0" hold ("NO" at step 107), then it is determined whether the SC value is 6 (step 111). If the decision rendered is "YES", then it is determined whether cell-header valid/invalid determination signal INV="1" holds or whether dummy insertion signal DUM="1" holds (step 112). If either INV or DUM is "1" ("YES" at step 112), it is determined whether the P-format cell detection signal ARDYPFMT is "1" (step 113). If ARDYPFMT="1" holds ("NO" at step 113), this means that a P-format cell has already been detected. The operations VALIDPTR="0", NPORP="0", therefore, are performed (step 114). If ARDYPFMT="0" holds ("YES" at step 113), this means that a P-format cell has not yet been detected and, hence, it is assumed that a cell for which SC value=6 holds was the P-format cell. The operations VALIDPTR="0", NPORP="1", ARDYPFMT="1" are performed (step 115) and control returns to the beginning.

If it is found at step 111 that SC value=6 does not hold or if it is found at step 112 that INV="0", DUM="0" hold ("NO" at step 112), then it is determined whether the CSI="1" holds (step 116). If CSI="1" holds ("YES" at step 116), then it is determined whether INV="0" holds (step 117). If INV="0" holds ("YES" at step 117), then it is determined whether the value (pointer value) PTR of the second byte of the cell of interest is a value in the range 0 to 93 (step 118). If the decision rendered is "YES", this means that the cell is a true P-format cell. The operations VALIDPTR="1", NPORP="1", ARDYPFMT=1, therefore, are performed (step 119) and control returns to the beginning. However, if the pointer value PTR is not in the range 0 to 93 but is 127, the cell is a P-format cell but it is judged that the pointer is not a pointer indicating the frame reference position (i.e., that the pointer is a false pointer). The operations VALIDPTR="0", NPORP="1", ARDYPFMT=1 are performed (step 120). If CSI="0" or INV="1" is found to hold at steps 116, 117, then it is judged that the cell is a non-P-format cell, the operations VALIDPTR="0", NPORP="0" are performed (step 121) and control returns to the beginning.

Thus, in accordance with the first embodiment, a cell (a dummy cell for which the SC value is even or an invalid cell for which the SC value is even) that has a high likelihood of being a P-format cell is assumed to be a P-format cell when a P-format cell has been lost. Furthermore, pointer timing is predicted using the value of the count recorded by the downcounter SPECTR. When a P-format cell has been lost at the predicted timing, a dummy cell or invalid cell for which the SC value is even at this timing is judged to be a P-format cell. As a result, judgment of P-format cells can be made with greater precision. By virtue of the foregoing, a correct P-format cell can be assumed in one cycle (SC=0~7) and the IFL of a receive buffer can be prevented from fluctuating as a result of judging a P-format cell to be a non-P-format cell or judging a non-P-format cell to be a P-format cell.

Furthermore, even if a P-format cell is lost, the fact that a cell is assumed to be a P-format cell assures that a large quantity of reproduced data will not be lost as a consequence of loss of P-format cells.

(D) Second Embodiment of Interface Having Band Adjustment Function

Figure 25:
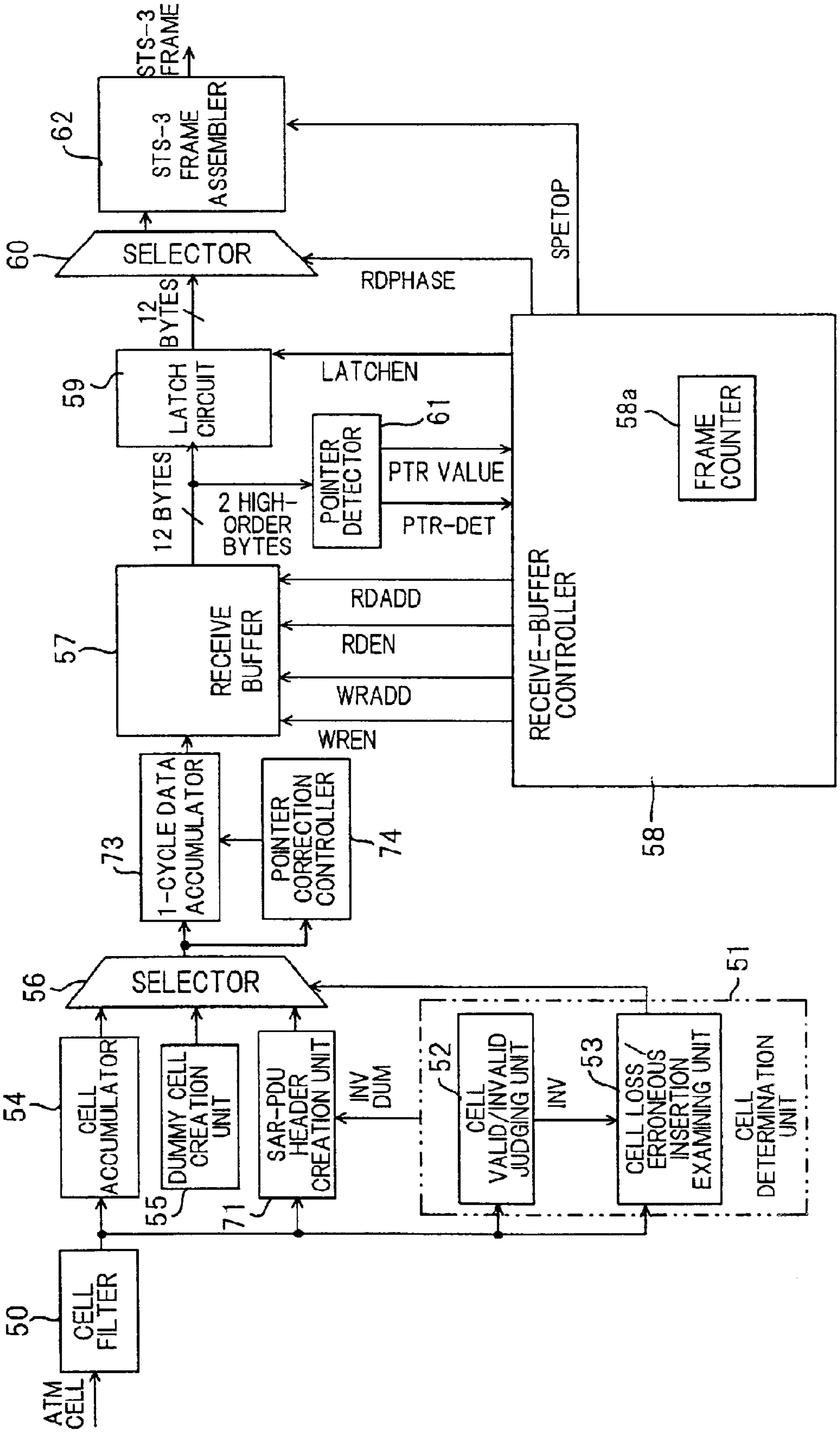
FIG. 25 is a diagram showing another construction of an interface on the exit side of an ATM network having a band adjustment function.

FIG. 25 is a diagram showing another construction of an interface provided on the exit side of an ATM network and having a band adjustment function. Components identical with those shown in FIG. 20 are designated by like reference characters. This arrangement differs in that (1) the SAR-PDU header creation unit 71 is provided; (2) the cell determination unit 51 outputs the cell-header valid/invalid determination signal INV and the dummy cell insertion signal DUM; (3) a data accumulator 73 for storing one cycle of cells (SC=0~7) is provided in front of the receive buffer 57; and (4) a pointer correction controller 74 for correcting a pointer upon referring to the SAR-PDU header of each cell of one stored cycle of cells is provided in front of the receive buffer 57.

Figure 26:
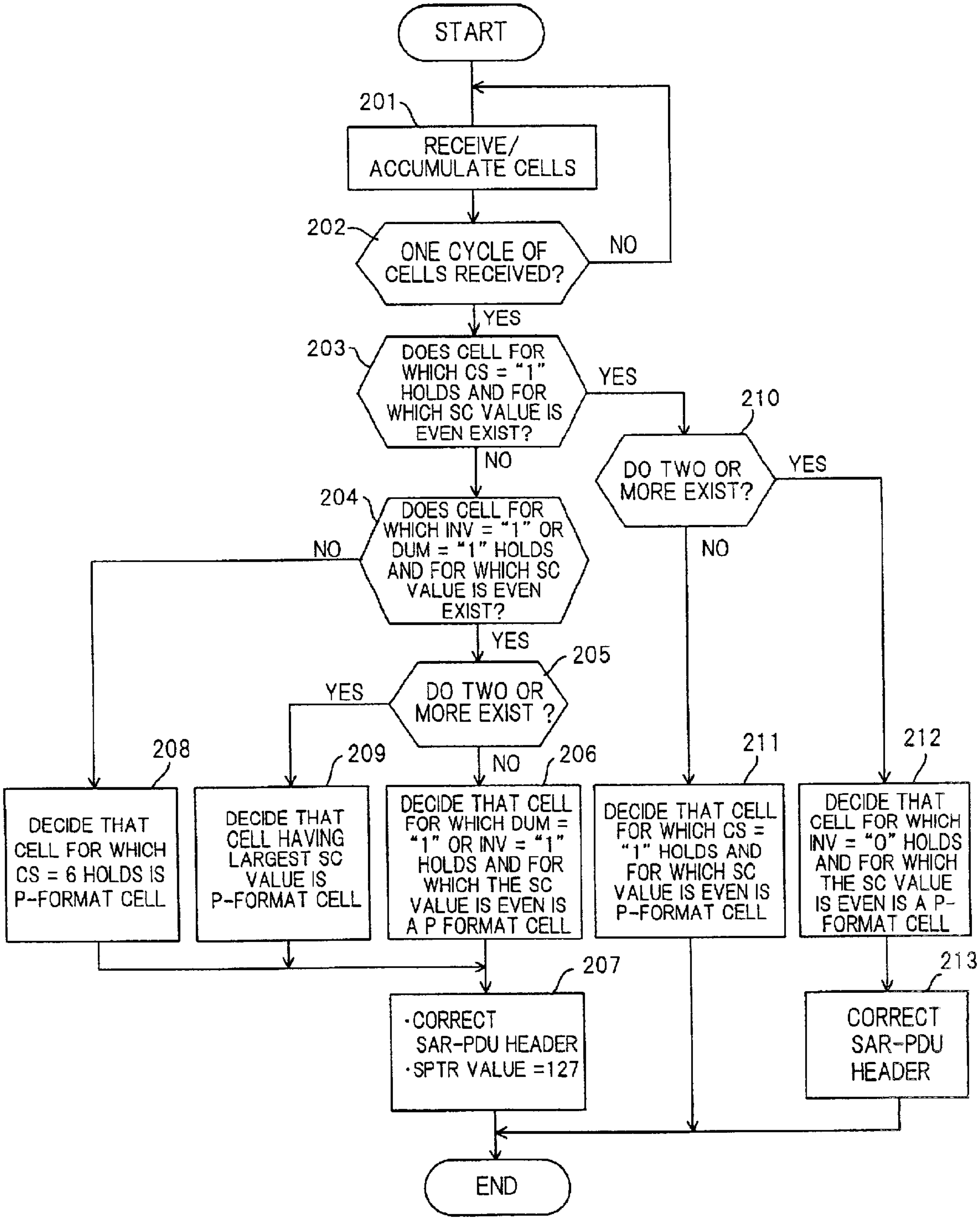
FIG. 26 is a flowchart illustrating pointer correction processing.

The cell valid/invalid judging unit 52, cell loss/erroneous insertion examining unit 53, cell accumulator 54, dummy cell creation unit 55, selector 56 and SAR-PDU header creation unit 71 operate in the same manner as set forth in connection with the first embodiment of FIG. 20. Specifically, (1) when INV="0", DUM="0" hold, and when INV="1", DUM="0" hold, the selector 56 splits, 12 bytes at a time four times, the total of one byte of SAR-PDU data that has been created by the SAR-PDU header creation unit 71 and 47-byte cell-payload data from the second byte onward that has been stored in the cell accumulator 54, and outputs the result (see FIG. 23). (2) When INV="1", DUM="1" hold, the selector 56 splits, 12 bytes at a time four times, the total of one byte of SAR-PDU data that has been created by the SAR-PDU header creation unit 71 and 47-byte dummy data that has been created by the dummy cell creation unit 55, and outputs the result. The data accumulator 73 stores a payload of one cycle output from the selector 56, and the pointer correction controller 74 performs pointer correction, in accordance with the flowchart of pointer correction processing shown in FIG. 26, while referring to the SAR-PDU header of each cell of one cycle of accumulated cells.

Specifically the data accumulator 73 receives and accumulates a cell payload output from the selector 56 (step 201). The pointer correction controller 74 checks to see whether one cycle of cells has arrived (step 202). If one cycle of cells has accumulated, it is determined whether a cell for which CSI="1" holds and for which the SC value is even exists (step 203). If the answer is "NO", it is determined whether a cell for which DUM="1" or INV="1" holds and for which the SC value is even exists (step 204). If the answer is "YES", it is determined whether a plurality of these cells exist (step 205). If only one exists ("NO" at step 205), then it is decided that the cell for which DUM="1" or INV="1" holds and for which the SC value is even is a P-format cell (step 206). The CSI of the SAR-PDU header that is the first byte of the cell payload is made "1" and the pointer value that is the second byte is made 127 (indicative of a false pointer) (step 207).

On the other hand, if it is found at step 204 that a cell for which DUM="1" or INV="1" holds and for which the SC value is even does not exist ("NO" at step 204), then it is decided that the cell for which SC=6 holds is a P-format cell (step 208), after which the processing of step 207 is executed. If it is found at step 205 that there are a plurality of cells for which DUM="1" or INV="1" holds and for which the SC values are even, it is decided that the cell having the largest SC value is a P-format cell (step 209), after which the processing of step 207 is executed.

If it is found at step 203 that a cell for which CSI="1" holds and for which the SC value is even exists, it is determined whether there are two or more of these cells (step 210). If there is only one such cell, it is decided that this cell is a P-format cell (step 211). If there are two cells for which CSI="1" holds and for which the SC values are even, it is decided that the cell for which INV="0", DUM="0" hold and for which the SC value is even is a P-format cell (step 212) and the CSI of the cell for which INV "1" or DUM="1" holds and for which SC value is even is corrected to "0" (step 213).

A cell that has been corrected by the above-described processing is stored in the receive buffer 57, after which control similar to that of the embodiment shown in FIG. 20 is carried out and user data is sent from the receive buffer 57 to the STS-3 frame assembler 62.

Thus, in accordance with the second embodiment, a cell (a dummy cell for which the SC value is even or an invalid cell for which the SC value is even) that has a high likelihood of being a P-format cell is assumed to be a P-format cell when a P-format cell has been lost. As a result, P-format cells can be assumed correctly every cycle (SC=0~7) and the IFL of a receive buffer can be prevented from fluctuating as a result of judging a P-format cell to be a non-P-format cell or judging a non-P-format cell to be a P-format cell.

Further, in accordance with the second embodiment, even if a P-format cell is lost, the fact that a cell is assumed to be a P-format cell correctly assures that a large quantity of reproduced data will not be lost as a consequence of loss of P-format cells.

(E) Third Embodiment of Interface Having Band Adjustment Function

Figure 27:
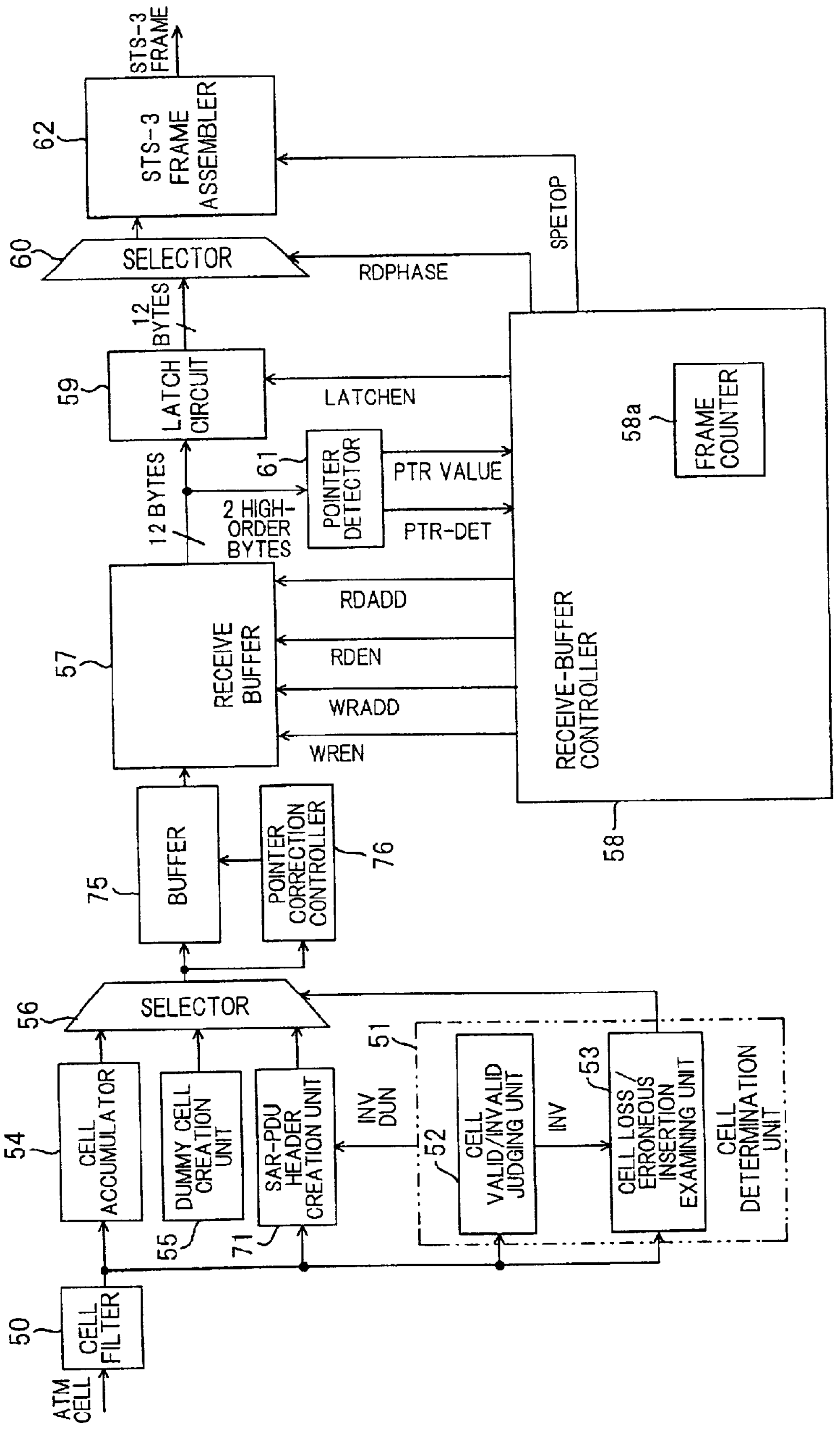
FIG. 27 is a diagram showing a third embodiment of an interface on the exit side of an ATM network having a band adjustment function.

FIG. 27 is a diagram showing another construction of an interface provided on the exit side of an ATM network and having a band adjustment function. Components identical with those shown in FIG. 25 are designated by like reference characters. This arrangement differs in that (1) a data accumulator 75 for one cell is provided in front of the receive buffer 57, and (2) a pointer correction controller 76 for correcting a pointer in accordance with the flowchart of FIG. 28 upon referring successively to the SAR-PDU headers of cells is provided in front of the receive buffer 57.

Figure 28:
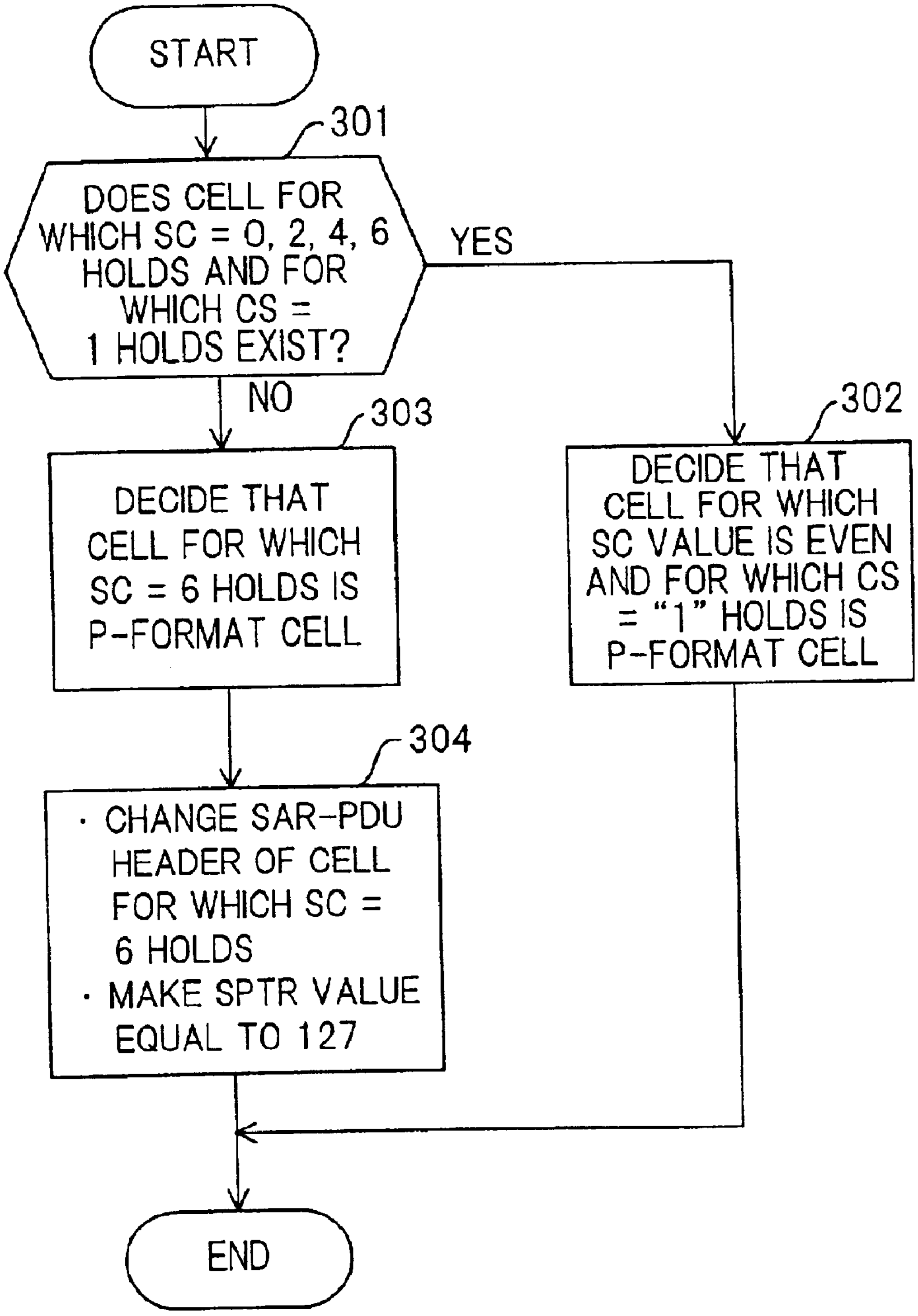
FIG. 28 is a flowchart illustrating pointer correction processing.

In the flowchart of FIG. 28 illustrating processing for pointer correction, the pointer correction controller 76 determines whether CSI="1" holds for every cell for which SC is an even number (step 301). If CSI="1" holds, it is decided that the cell for which the SC value is even is a P-format cell (step 302).

If a cell for which CSI="1" holds does not exist among cells for which SC=0, SC=2, SC=4, SC=6 hold, however, the cell for which SC=6 holds is decided upon as being the P-format cell (step 303), the CSI of the SAR-PDU header (first byte) in the payload for which SC=6 holds is made "1" and the pointer value (second byte) is made 127 (indicative of a false pointer) (step 304).

Thus, in accordance with the third embodiment, it is determined, cycle by cycle, whether a cell for which the SC value is even is a P-format cell. When a P-format cell has been lost, it is assumed that the cell for which SC=6 holds is a P-format cell. As a result, the data accumulator for one cycle employed in the second embodiment may be dispensed with, thereby making it possible to assume that a cell is a P-format cell through a simpler arrangement.

Specifically, in accordance with the third embodiment, in a case where a cell that has been lost exists on the side of an ATM network, processing can be simplified over that of the second embodiment by taking into consideration the fact that the content of STS-3 frame data cannot be reproduced normally in such case. Moreover, coincidence of the bands corresponding to both the STS-3 and ATM networks can be assured.

(E) Fourth Embodiment of Interface Having Band Adjustment Function

Figure 29:
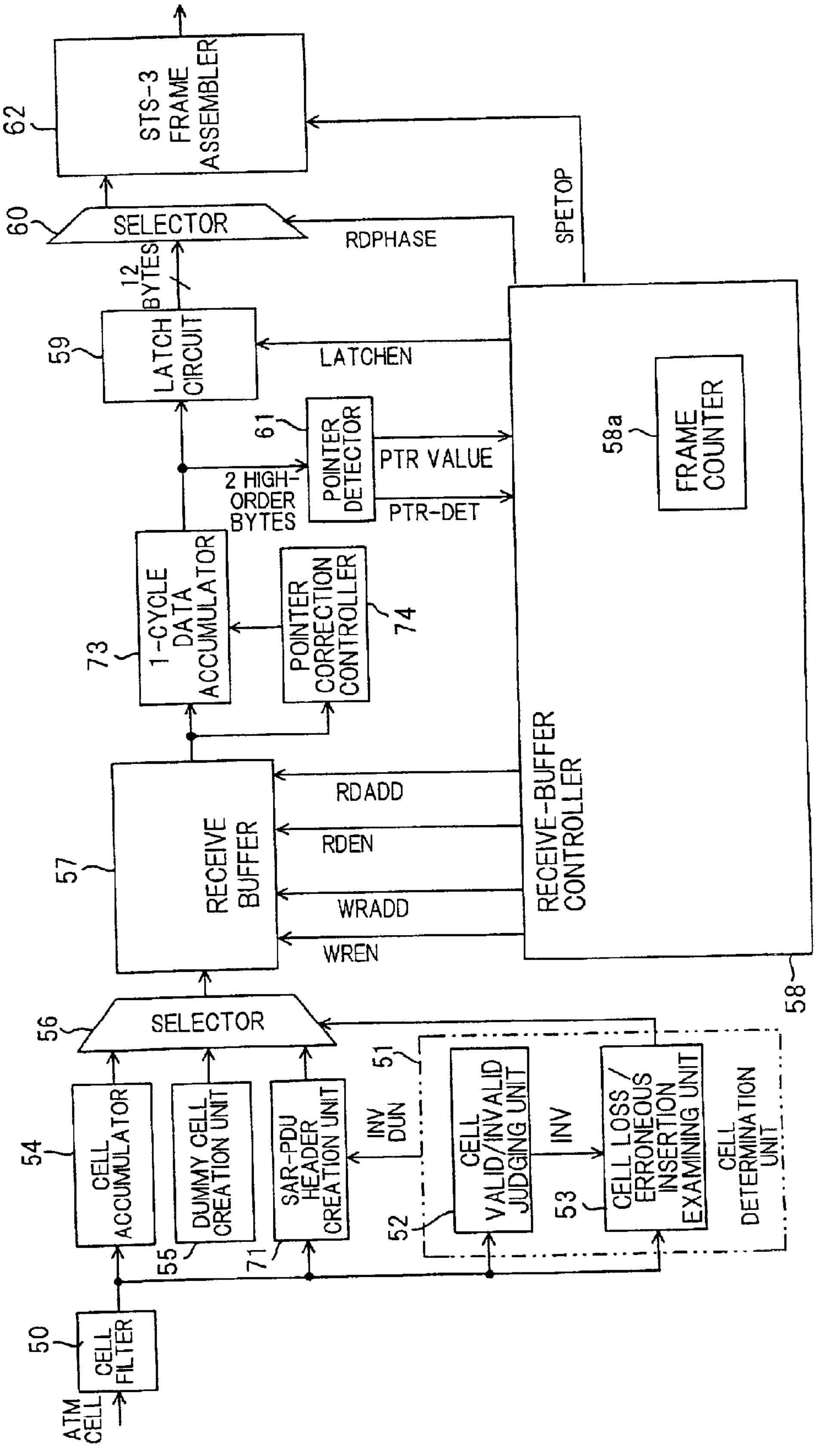
FIG. 29 is a diagram showing a fourth embodiment of an interface on the exit side of an ATM network having a band adjustment function.
Figure 30:
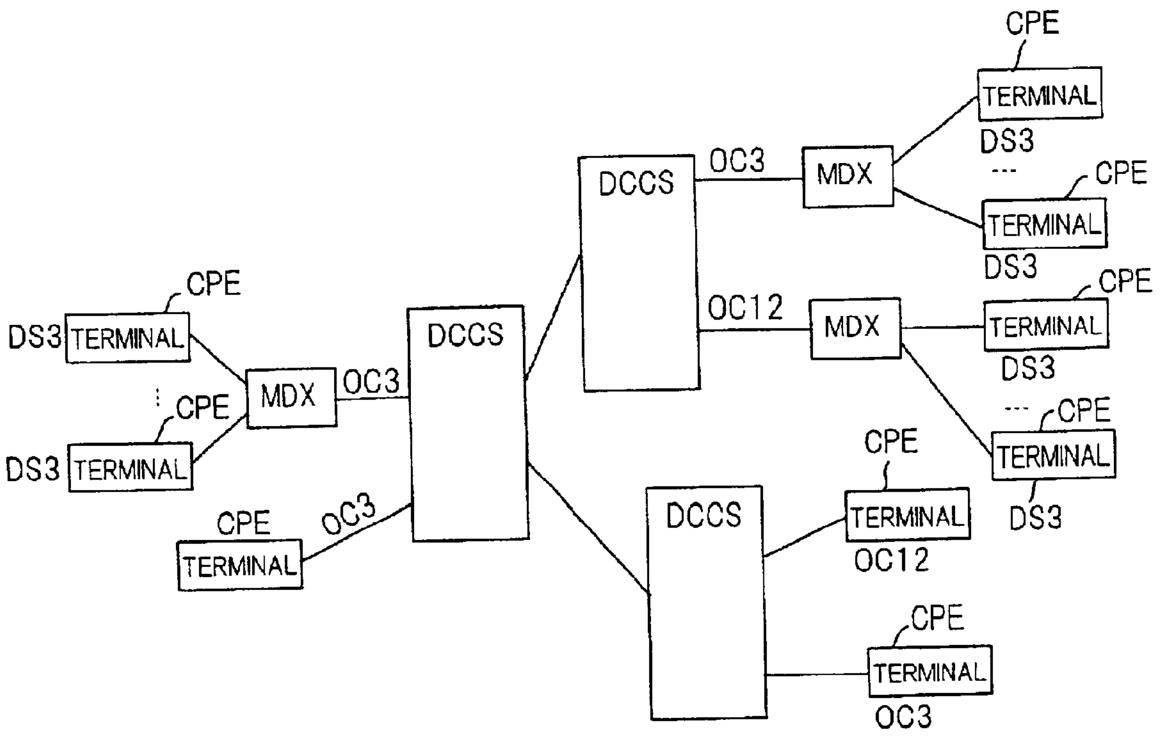
FIG. 30 is a diagram illustrating a dedicated service network constituted by SONET transmission lines.
Figure 31:
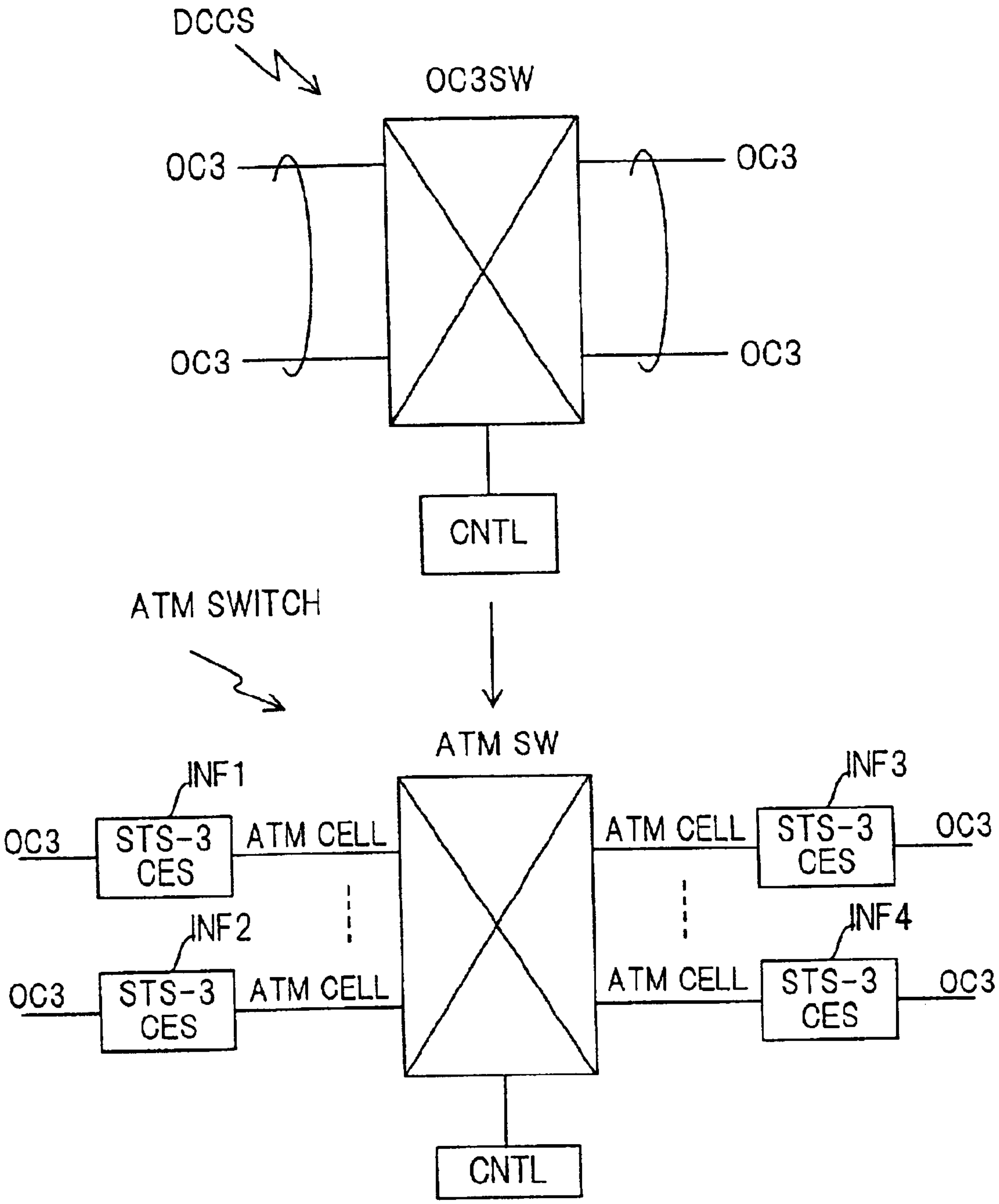
FIG. 31 is a diagram illustrating an ATM having a CE function.

FIG. 29 is a diagram showing the construction of a fourth embodiment of an interface provided on the exit side of an ATM network and having a band adjustment function. Components identical with those shown in FIG. 25 are designated by like reference characters. This arrangement differs in that the data accumulator 73 for one cycle and pointer correction controller 74 are provided on the output side (read-out side) of the receive buffer 57. This is the difference between whether pointer correction control is performed before a cell payload is written to the receive buffer (the second embodiment) and whether pointer correction control is performed after a cell payload is read out of the receive buffer (the third embodiment). The way in which pointer correction control is performed, however is the same.

It should be noted that the data accumulator 75 and pointer correction controller 76 in the third embodiment can similarly be provided on the read-out side of the receive buffer 57.

The fourth embodiment provides effects similar to those of the third embodiment.

Thus, in accordance with the present invention, the necessary part of overhead and payload are adopted as a cell conversion zone, whereby transmission band can be reduced. Moreover, since a pointer specifying the reference position (e.g., starting position) of the cell conversion zone is included in a cell, the original frame format can be assembled from received cells.

Further, in accordance with the present invention, if a P-format cell is lost owing to cell loss or cell garbling, etc., a P-format cell can be generated, it can be so arranged that the IFL set for a receive buffer will not fluctuate, and it can be so arranged that starvation and overflow will not occur.

Further, in accordance with the present invention, a cell (a dummy cell for which the SC value is even or an invalid cell for which the SC value is even) that has a high likelihood of being a P-format cell is assumed to be a P-format cell when a P-format cell has been lost. As a result, a cell can be assumed to be a P-format cell correctly every cycle (SC=0~7) and the IFL of a receive buffer can be prevented from fluctuating as a result of judging a P-format cell to be a non-P-format cell or judging a non-P-format cell to be a P-format cell. Moreover, even if a P-format cell is lost, the fact that a prescribed cell is assumed to be a P-format cell assures that a large quantity of reproduced data will not be lost as a consequence of loss of P-format cells.

Further, in accordance with the present invention, pointer timing is predicted using the value of a count recorded by a downcounter SPECTR. When a P-format cell is lost at the predicted timing, a prescribed cell is judged to be a P-format cell based upon this timing. This makes it possible to raise the precision with which P-format cells are judged. As a result, it is possible to make an assumption of a correct P-format cell in one cycle (SC=0~7), and the IFL of a receive buffer can be prevented from fluctuating as a result of judging a P-format cell to be a non-P-format cell or judging a non-P-format cell to be a P-format cell. Furthermore, even if a P-format cell is lost, the fact that a prescribed cell is assumed to be a P-format cell assures that a large quantity of reproduced data will not be lost as a consequence of loss of P-format cells.

Further, in accordance with the present invention, when a P-format cell is lost at a predicted timing, a dummy cell for which the SC value is even or an invalid cell for which the SC value is even at this timing is judged to be a P-format cell. This makes it possible to raise the precision with which P-format cells are judged.

Further, in accordance with the present invention, whether a cell having an even-numbered SC value is a P-format cell is checked successively every cycle and, when a P-format cell is lost, a cell for which SC is equal to 6 is assumed to be a P-format cell. As a result, P-format cells can be inferred through a simple arrangement without requiring the provision of a data accumulator for one cycle. and it possible to assure agreement between the bands of STS-3 and ATM networks.

As many apparently widely different embodiments of the present invention can be made without departing from the spirit and scope thereof, it is to be understood that the invention is not limited to the specific embodiments thereof except as defined in the appended claims.

What is claimed is:

1. An interface apparatus in a communication network for converting a frame, which has been received from a digital transmission line and has overhead and a payload, to ATM cells, assembling a frame using ATM cells that have been received from and ATM network, and sending the assembled frame to a digital transmission line, said interface apparatus comprising;

cell conversion zone specifying means for specifying, as a cell conversion zone, the portion of a frame that contains the payload and a first pointer of the overhead, which indicates each of the starting positions of plural data blocks that have been multiplexed into the frame, and generating a signal that specifies the cell conversion zone;

pointer creation means which, when a predetermined position in the cell conversion zone is adopted as a reference position, is for creating a second pointer that specifies this reference position; and cell conversion means for converting data in the cell conversion zone to cells based upon the signal that specifies the cell conversion zone, and for including said second pointer in a prescribed cell.

2. The apparatus according to claim 1, further comprising a header creation unit for creating an SAR-PDU header when said cell is an AAL Type-1 cell;

wherein said cell conversion means judges whether or not it is necessary to specify said reference position, and (1) if necessary, said cell conversion means creates a payload of one cell by arraying an SAR-PDU header first, a second pointer second and data of the cell conversion zone following the second pointer, and (2) if unnecessary, said cell conversion means creates a payload of one cell by arraying an SAR-PDU header first and data of the cell conversion zone second following the SAR-PDU header.

3. An interface apparatus in a communication network for converting a frame, which has been received from a digital transmission line and has overhead and a payload, to ATM cells, assembling a frame using ATM cells that have been received from and ATM network, and sending the assembled frame to a digital transmission line, said interface apparatus comprising;

cell conversion zone specifying means for specifying, as a cell conversion zone, the portion of a frame that contains the payload and part of the overhead, which indicates each of the starting positions of data blocks that have been multiplexed into the frame, and generating a signal that specifies the cell conversion zone:

pointer creation means which, when a predetermined position in the cell conversion zone is adopted as a reference position, is for creating a pointer that specifies this reference position;

cell conversion means for converting data in the cell conversion zone to cells based upon the signal that specifies the cell conversion zone, and for including this pointer in a prescribed cell; and a header creation unit for creating an SAR-PDU header when said cell is an AAL Type-1 cell;

wherein (1) if a pointer exists, said cell conversion means creates a payload of one cell by arraying an SAR-PDU header first, a pointer second and data of the cell conversion zone following the pointer, and (2id a pointer does not exist, said cell conversion means creates a payload of one cell by arraying an SAR-PDU header first and data of the cell conversion zone second following the SAR-PDU header, and wherein said pointer creation unit includes:

a downcounter, which is preset to (M−1) by generation of the signal that specifies the cell conversion zone, for subsequently downcounting a byte timing signal generated in the period of the cell conversion zone and outputting (M−1) to 0 cyclically, where M represents the number of bytes within the cell conversion zone and the reference position is the leading byte of the cell conversion zone;

an octet position monitoring unit for monitoring octet position within a cell payload by counting the byte timing signal;

a sequence-count monitoring unit for being counted up at the position of the leading octet of the cell payload and outputting a sequence count SC of from 0 to 7 in a case where one cycle is composed of eight cells; and a pointer decision unit which, when the octet position within a cell payload is at the leading octet position, the sequence count is and even number and, moreover, the value of a count recorded by the downcounter falls within the range of 93 to 0, is for adopting this value of the count as a true pointer; wherein said cell conversion means places the true pointer at a second octet position of the payload.

4. The apparatus according to claim 3, wherein a pointer always is placed in any one of the eight cells of one cycle, and, if the true pointer cannot be placed in any cell of one cycle, said pointer decision unit regards a cell for which SC=6 hods as a P-format cell in which a pointer is placed and places a false pointer in a second byte of the payload of this cell.

5. The apparatus according to claim 4, further comprising:

a receive buffer for storing, in sync with a buffer write clock, an AAL Type-1 cell payload that has been received from an ATM network, and for reading out the cell payload in sync with a buffer read-out clock;

a detector for detecting a pointer from a payload that has been read out of said receive buffer;

selector means for outputting data of the payload from a third byte onward if a pointer is detected and outputting data of the payload from a second byte onward if a pointer is not detected;

a controller having a frame counter, which is preset to (R−1−pointer) when the true pointer is detected, for subsequently counting up the byte timing signal and outputting 0 to (R−1) cyclically (where R represents the total number of bytes of a frame), said controller outputting a starting position signal, which indicates the starting position of the cell conversion zone, when the value of the count is a value that corresponds to the reference position of the cell conversion zone; and a frame assembler for assembling a frame using data output from said selector means on the basis of the starting position signal.

6. An interface apparatus in a communication network in which when a frame that has been received form a digital transmission line and that has overhead and a payload is converted to AAL Type-1 ATM cells, part of the overhead data, which indicates each of the starting positions of data blocks that have been multiplexed into the frame, and the payload are defined as being at least a cell conversion zone and a predetermined position of the cell conversion zone is adopted as a reference position, wherein a true pointer that specifies this reference position is included in a prescribed cell and, if a true pointer cannot be placed in any one of eight cells of one cycle (SC=0 to 7), then a cell for which SC=6 holds is regarded as a P-format cell in which a pointer will be placed, a false pointer is placed in this cell and the cell is sent to an ATM network, and a frame is assembled by AAL Type-1 cells that have been received from the ATM network and the frame is sent to a digital transmission line, said interface apparatus comprising:

a receive buffer for storing, in sync with a buffer write clock, an AAL Type-1 cell payload that has been received from an ATM network, and for reading out the cell payload in sync with a buffer read-out clock;

a detector for detecting a pointer from a payload that has been read out of said receive buffer;

selector means for outputting data of the payload from a third byte onward if a pointer is detected and outputting data of the payload from a second byte onward if a pointer is not detected;

a controller having a frame counter, which is preset to (R−1−pointer) when a true pointer is detected, for subsequently counting up the byte timing signal and outputting 0 to (R−1) cyclically (where R represents the total number of bytes of a frame), said controller outputting a starting position signal, which indicates the starting position of the cell conversion zone, when the value of the count is a value that corresponds to the reference position; and a frame assembler for assembling a frame using data output from said selector means on the basis of the starting position signal.

7. The apparatus according to claim 6, further comprising:

cell determination means (1) which, on the basis of a CRC check and parity check of an SAR-PDU header that has been placed at the beginning of a cell payload, determines whether the SAR-PDU header is valid or invalid, and (2) detects cell loss/erroneous insertion based upon result of the determination and continuity of sequence count SC;

write means for writing, to the SAR-PDU header, a flag indicating result of the valid/invalid determination and a flag indicating whether a dummy cell has been inserted owing to cell loss; and means which, on the basis of the result of cell determination, is for adding the SAR-PDU header to which the flags have been written onto a cell payload or dummy payload received from the ATM network and inputting this payload to cell buffer;

wherein said detector for detecting the pointer includes:

pointer detection means for detecting a true pointer;

a downcounter, which is preset to a pointer value by detection of a true pointer, for subsequently downcounting a byte timing signal generated in the period of the cell conversion zone and outputting (M−1) to 0 cyclically, where M represents the number of bytes within the cell conversion zone and the reference position is the leading byte of the cell conversion zone; and P-format cell determination means which, when a cell of interest is a cell for which the sequence count SC is an even number, the value of a count recorded by said downcounter falls within the prescribed range of 0 to 93 at the timing of the leading octet of a cell payload, the flags of the cell of interest indicate invalidity or dummy cell insertion and a P-format cell has not yet been detected in one cycle, is for deciding that said cell of interest is a P-format cell.

8. The apparatus according to claim 7, wherein when the cell of interest is a cell for which SC=6 holds, the flags of this cell of interest indicate invalidity or dummy cell insertion and a P-format cell has not yet been detected in one cycle, said P-format cell determination means decides that said cell of interest is a P-format cell.

9. The apparatus according to claim 7, wherein when the cell of interest is a cell for which the sequence count SC is an even number, a CSI bit of the SAR-PDU header is "1" and the value of a count recorded by said downcounter falls within the prescribed range of 0 to 93 at the timing of the leading octet of a cell payload, said pointer detection means decides that a pointer of said cell of interest is a true pointer.

10. The apparatus according to claim 6, further comprising:

cell determination means (1) which, on the basis of a CRC check and parity check of an SAR-PDU header that has been placed at the beginning of a cell payload, determines whether the SAR-PDU header is valid or invalid, and (2) detects cell loss/erroneous insertion based upon result of the determination and continuity of sequence count SC;

write means for writing, to the SAR-PDU header, a flag indicating result of the valid/invalid determination and a flag indicating whether a dummy cell has been inserted owing to cell loss; and means which, on the basis of the result of cell determination, is for adding the SAR-PDU header to which the flags have been written onto a cell payload or dummy payload received from the ATM network and outputting this payload;

a storage unit for storing one cycle of cell payloads of AAL Type 1 output from output means; and P-format cell determination means for examining the cells of one stored cycle and, when a P-format cell has been lost, for (1) deciding that a cell for which the sequence count SC is an even number and for which a flag indicates invalidity or insertion of dummy data is a P-format cell, and (2) making a CSI bit of this cell equal to "1" and inserting a false pointer;

an AAL Type-1 cell payload being written to said receive buffer after the examination.

11. The apparatus according to claim 10, wherein said P-format cell determination means examines the cells of one stored cycle and, when two or more P-format cells are found to exist, decides that a cell for which the flag indicates "valid" and "non-insertion of dummy data" is a P-format cell.

12. The apparatus according to claim 6, further comprising:

cell determination means (1) which, on the basis of a CRC check and parity check of an SAR-PDU header that has been placed at the beginning of a cell payload, determines whether the SAR-PDU header is valid or invalid, and (2) detects cell loss/erroneous insertion based upon result of the determination and continuity of sequence count SC;

write means for writing, to the SAR-PDU header, a flag indicating result of the valid/invalid determination and a flag indicating whether a dummy cell has been inserted owing to cell loss;

means which, on the basis of the result of cell determination, is for adding the SAR-PDU header to which the flags have been written onto a cell payload or dummy payload received from the ATM network and inputting this payload to said cell buffer;

a storage unit for storing one cycle of cell payloads of AAL Type 1 output from said receive buffer; and P-format cell determination means for examining the calls of one stored cycle and, when a P-format cell has been lost, for (1) deciding that a cell for which the sequence count SC is an even number and for which a flag indicates invalidity or insertion of dummy data is a P-format cell, and (2) making a CSI bit of this cell equal to "1" and inserting a false pointer;

an AAL Type-1 cell payload after the examination being input to said pointer detector and selector.

13. The apparatus according to claim 12, wherein said P-format cell determination means examines the cells of one stored cycle and, when two or more P-format cells are found to exist, decides that a cell for which the flags indicate "valid" and "non-insertion of dummy data" is a P-format cell.

14. The apparatus according to claim 6, further comprising P-format cell determination means for examining the AAL Type-1 cell payload and, if a P-format cell cannot be detected in one cycle, deciding that a P-format cell for which SC=6 holds is a P-format cell, making a CSI bit of this cell equal to "1" and inserting a false pointer; wherein an AAL Type-1 cell payload after the examination is written to said receive buffer.

* * * * *